(12) United States Patent
Haag

(10) Patent No.: US 10,439,217 B2
(45) Date of Patent: Oct. 8, 2019

(54) LITHIUM INTERCALATED NANOCRYSTAL ANODES

(71) Applicant: MSMH, LLC, Des Plaines, IL (US)

(72) Inventor: Michael Allen Haag, Boulder, CO (US)

(73) Assignee: MSMH, LLC, Des Plaines, IL (US)

( * ) Notice: Subject to any disclaimer, the term of this patent is extended or adjusted under 35 U.S.C. 154(b) by 124 days.

(21) Appl. No.: 15/311,482

(22) PCT Filed: May 15, 2015

(86) PCT No.: PCT/US2015/031262
§ 371 (c)(1),
(2) Date: Nov. 15, 2016

(87) PCT Pub. No.: WO2015/176051
PCT Pub. Date: Nov. 19, 2015

(65) Prior Publication Data
US 2017/0084914 A1 Mar. 23, 2017

Related U.S. Application Data

(60) Provisional application No. 61/993,779, filed on May 15, 2014, provisional application No. 61/993,840, (Continued)

(51) Int. Cl.
*H01M 4/38* (2006.01)
*H01M 4/134* (2010.01)
(Continued)

(52) U.S. Cl.
CPC ......... *H01M 4/386* (2013.01); *H01M 4/0404* (2013.01); *H01M 4/045* (2013.01); (Continued)

(58) Field of Classification Search
CPC .... H01M 4/386; H01M 10/0525; H01M 4/38; H01M 4/0404; H01M 4/045;
(Continued)

(56) References Cited

U.S. PATENT DOCUMENTS 6,080,232 A 6/2000 Sperlich et al.
7,811,543 B2 10/2010 Didenko et al.
(Continued)

FOREIGN PATENT DOCUMENTS

CN 201382691 Y 1/2010
EP 1930063 A1 6/2008
(Continued)

OTHER PUBLICATIONS

Boccaccini et al., "Electrophoretic deposition of carbon nanotubes", Carbon. vol. 44, Issue 15, 2006, pp. 3149-3160.
(Continued)

*Primary Examiner* — Gary D Harris
(74) *Attorney, Agent, or Firm* — Dorsey & Whitney LLP

(57) ABSTRACT

A prelithiated anode for use in a lithium ion battery is composed of an electrode substrate, a paste distributed on the electrode substrate and comprising a plurality of Si, Ge, or SiGe nanocrystals intercalated with lithium ions, and a binder mixed with the paste to adhere the paste to the electrode substrate. The lithiated anode paste may be formed by an electrodeposition process or an electrolytic process.

14 Claims, 19 Drawing Sheets

Related U.S. Application Data filed on May 15, 2014, provisional application No. 61/993,870, filed on May 15, 2014.

(51) Int. Cl.
| | | |
|---|---|---|
| *H01M 4/1395* | (2010.01) | |
| *H01M 4/04* | (2006.01) | |
| *H01M 10/0525* | (2010.01) | |
| *H01M 4/02* | (2006.01) | |

(52) U.S. Cl.
CPC ......... *H01M 4/134* (2013.01); *H01M 4/1395* (2013.01); *H01M 4/38* (2013.01); *H01M 10/0525* (2013.01); *H01M 2004/021* (2013.01); *H01M 2004/027* (2013.01)

(58) Field of Classification Search
CPC .............. H01M 4/134; H01M 4/1395; H01M 2004/027; H01M 2004/021
USPC .................................................... 429/231.95
See application file for complete search history.

(56) References Cited

U.S. PATENT DOCUMENTS

| | | | |
|---|---|---|---|
| 8,388,725 | B2 | 3/2013 | Lee et al. |
| 8,609,183 | B2 | 12/2013 | Wang et al. |
| 8,663,840 | B2 | 3/2014 | Nazri et al. |
| 8,865,574 | B2 | 10/2014 | Haag |
| 9,601,748 | B2 | 3/2017 | Haag |
| 2002/0037451 | A1 | 3/2002 | Eguchi et al. |
| 2004/0146784 | A1 | 7/2004 | Gao et al. |
| 2005/0272214 | A1 | 12/2005 | Chiang et al. |
| 2007/0099330 | A1 | 5/2007 | Kodas et al. |
| 2007/0111319 | A1 | 5/2007 | Bastide et al. |
| 2007/0255002 | A1 | 11/2007 | Alba |
| 2008/0041446 | A1 | 2/2008 | Wu et al. |
| 2008/0067618 | A1 | 3/2008 | Wang et al. |
| 2008/0254362 | A1 | 10/2008 | Raffaelle et al. |
| 2008/0274036 | A1 | 11/2008 | Resasco et al. |
| 2009/0114275 | A1 | 5/2009 | Zaban et al. |
| 2009/0205181 | A1 | 8/2009 | Koizumi et al. |
| 2009/0317504 | A1 | 12/2009 | Rajala et al. |
| 2010/0028249 | A1 | 2/2010 | Didenko et al. |
| 2010/0120179 | A1* | 5/2010 | Zhamu .................. H01M 4/134 438/19 |
| 2010/0148144 | A1 | 6/2010 | Britton et al. |
| 2010/0152468 | A1 | 6/2010 | Kansal et al. |
| 2010/0173198 | A1 | 7/2010 | Zhamu et al. |
| 2010/0231095 | A1 | 9/2010 | Kubota et al. |
| 2010/0265307 | A1 | 10/2010 | Linton et al. |
| 2011/0049415 | A1 | 3/2011 | Lee et al. |
| 2011/0163636 | A1 | 7/2011 | Sirbuly et al. |
| 2012/0264017 | A1 | 10/2012 | Nazri et al. |
| 2013/0045427 | A1 | 2/2013 | Wang et al. |
| 2013/0130116 | A1 | 5/2013 | Ryu et al. |
| 2013/0164626 | A1 | 6/2013 | Manthiram et al. |
| 2013/0171355 | A1 | 7/2013 | Wang et al. |
| 2013/0202961 | A1 | 8/2013 | Hagen et al. |
| 2013/0271085 | A1 | 10/2013 | Chen et al. |

FOREIGN PATENT DOCUMENTS

| | | |
|---|---|---|
| EP | 2091091 A2 | 8/2009 |
| JP | 2007534118 A | 11/2007 |
| JP | 2008285749 A | 11/2008 |
| JP | 2013137981 A | 7/2013 |
| JP | 2013139371 A | 7/2013 |
| JP | 2013182689 A | 9/2013 |
| JP | 2013538413 A | 10/2013 |
| WO | 2007/015250 A2 | 2/2007 |
| WO | 2010/014979 A1 | 2/2010 |
| WO | 2012075011 A2 | 6/2012 |
| WO | 2012166529 A2 | 12/2012 |
| WO | 2013052456 A1 | 4/2013 |
| WO | 2013096751 A1 | 6/2013 |

OTHER PUBLICATIONS

International Search Report and Written Opinion, International application PCT/US2015/031262 dated Aug. 18, 2015, 8 Pages.
Kennedy, Tadhg et al., "High-Performance Germanium Nanowire-Based Lithium-Ion Battery Anodes Extending over 1000 Cycles Through in Situ Formation-of a Continuous Porous Network", American Chemical Society, Nano Lett., 14(2), pp. 716-723, 2014, A-H.
Klavetter, Kyle C. et al., "A high-rate germanium-particle slurry cast Li-ion with high Coulombic efficiency and long cycle life", J. of Power Sources, 238, 2013, pp. 123-136.
Mayer, "Future of electrotechnics: ferrofluids", Advances in electrical and electronic engineering, 2008, pp. 9-14.
Office Action for Japanese Patent Application No. 2017-512889, dated Feb. 27, 2018, with English translation (10 pages).
Office Action for Canadian Patent Application No. 2,949,093, dated Dec. 28, 2017 (3 pages).
Office Action for Korean Patent Application No. 10-2016-7035020, dated Nov. 17, 2017 (9 pages).
Ma et al., "Multiwalled carbon nanotubes-sulfur composites with enhanced electrochemical performance for lithium/sulfur batteries." Applied Surface Science, 2014, pp. 346-350, vol. 307.
Extended European Search Report for European Patent Application No. 15792065.3, dated Jun. 8, 2018 (9 pages).
Office Action for Korean Patent Application No. 10-2016-7035020, dated Jul. 19, 2018, with English translation (4 pages).
Carbon Disulfide Safety Data Sheet (Sigma-Aldrich, Version 5.2), 2014 (9 pages).
Characteristics and Properties of Single and Multi Walled Carbon Nanotubes (webpage obtained from https://www.azonano.com/article.aspx?ArticleID=1560), May 16, 2006 (6 pages).

* cited by examiner

LITHIUM INTERCALATED NANOCRYSTAL ANODES

CROSS REFERENCE TO RELATED APPLICATIONS

This application is a national phase application under 35 U.S.C. § 371 of International Application No. PCT/US2015/031262 filed on 15 May 2015 entitled "Lithium Intercalated Nanocrystal Anodes," which claims the benefit of priority pursuant to 35 U.S.C. § 119(e) of U.S. provisional application No. 61/993,840 filed 15 May 2014 entitled "Method for producing high energy capacity nanocrystal based anodes for lithium ion batteries," U.S. provisional application No. 61/993,870 filed 15 May 2014 entitled "Method for producing sulfur charged carbon nano tube cathodes for lithium ion batteries," and U.S. provisional application No. 61/993,779 filed 15 May 2014 entitled "Methods and systems for the synthesis of nano particles including strained nano particles," each of which is hereby incorporated herein by reference in its entirety.

TECHNICAL FIELD

The technology described herein relates to the design and manufacture of anodes for lithium ion batteries, and particularly to high energy capacity, prelithiated anodes of silicon and germanium nanocrystals.

BACKGROUND

Lithium ion batteries have been proven to offer higher energy and power density, a wider range of operating temperatures, and excellent cycle and calendar life when compared to other battery chemistries. Continued demand for various portable electronics, such as electric hand and power tools, as well as high power applications of electric based transportation, continues to direct research to focus on lower cost materials without compromise of reliability and life of lithium ion batteries.

The information included in this Background section of the specification, including any references cited herein and any description or discussion thereof, is included for technical reference purposes only and is not to be regarded subject matter by which the scope of the invention as defined in the claims is to be bound.

SUMMARY

In one exemplary implementation, a prelithiated anode for use in a lithium ion battery is composed of an electrode substrate, a paste distributed on the electrode substrate and comprising a plurality of Si, Ge, or SiGe nanocrystals intercalated with lithium ions, and a binder mixed with the paste to adhere the paste to the electrode substrate. The nanocrystals may have a multimodal size distribution, but are highly spherical in form and may be below threshold sizes depending upon the type of nanocrystal in order to maximize the intercalation of lithium and discharge and recharge cycles.

In another exemplary implementation, a method for manufacturing prelithiated anodes for use in a lithium ion battery may include a number of steps. Initially, Si, Ge, or SiGe nanocrystals may be mixed within a fluid containing a lithium electrolyte. A first lithium metal electrode may be placed within the fluid mixture. A second lithium metal electrode may be placed within the fluid mixture spatially separated from the first lithium metal electrode. A voltage may be applied across the electrodes such that the first lithium metal electrode is positively charged. A paste of lithium-intercalated Si, Ge, or SiGe nanocrystals is allowed to form on the first lithium metal electrode. The paste may be removed from the first lithium metal electrode and mixed with a binder. The paste and binder mixture may be deposited on a conductive anode substrate. The binder may be cured to adhere the paste to the conductive anode substrate.

In a further exemplary implementation, a method for manufacturing prelithiated anodes for use in a lithium ion battery may include a number of steps. Initially, Si, Ge, or SiGe nanocrystals may be mixed within an ionic fluid, a nonaqueous solvent, or a mixture of both. A lithium metal anode electrode may be placed within the mixture. A cathode electrode may be placed\ within the mixture spatially separated from the lithium metal anode electrode. A voltage may be applied across the electrodes such that the lithium metal anode electrode is positively charged. A paste of lithium-intercalated Si, Ge, or SiGe nanocrystals is allowed to form on the lithium metal anode electrode. The paste may be removed from the lithium metal anode electrode and mixed with a binder. The paste and binder mixture may be deposited on a conductive anode substrate. The binder may be cured to adhere the paste to the conductive anode substrate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

High-power and energy-dense lithium-ion batteries are desirable for portable electronics, electric vehicles, and peak power storage for increased life, range, and capacity. Improvements to lithium-ion cathodes and anodes are sought to increase storage capacity and the number of recharge cycles before structural breakdown.

Sulfur-Charged Carbon Nanotube Cathodes

The lithium-sulfur (Li—S) cell has become an attractive option for cathode architecture because of the high theoretical specific energy density of about 2600 Wh/kg (1672 mAh/g), assuming complete reaction to Li2S. Additionally, advancing lithium-sulfur energy (Li—S) storage cyclability (i.e., the number of times a battery can be recharged before dropping below 80% of its initial capacity) has the potential to substantially improve battery technology because of a high theoretical energy density (1672 mA h g$^{-1}$) of Li—S architecture for use in lithium-ion batteries. In addition to the high capacity, using sulfur as a cathode material has the advantages of high natural abundance and low cost while also being ecofriendly. In traditional Li—S architectures, low cyclability prevents the technology from being a commercially viable product. Recent advances in material technologies and applications with respect to electric vehicles have spurned new interest in Li—S systems.

Traditional Li—S battery systems have several drawbacks. First, elemental sulfur has poor electrical conductivity (5.0 e$^{-14}$ S*cm$^{-1}$). Second, polysulfides ($Li_2S_n$) may branch into the electrolyte solution between the anode and the cathode during cycling. If the polysulfides cross the separator between the anode and cathode and react with the lithium negative electrode, the amount of active sulfur in the cathode is reduced and subsequently cycling efficiency decreases with each cycle. Ultimately, the reduction in sulfur can cause the battery to short. Continuous reduction of the $Li_2S_n$ polysulfides by the Li anodes prevents the redox reaction back to elemental sulfur at the cathode side upon charging. This cyclic process is known as the "shuttle" phenomenon of Li—S sulfur systems and leads to a limited capacity much lower than the theoretical value of sulfur electrodes. Third, production of Li—S cathodes can result in unusable byproducts that increase waste.

Figure 1:
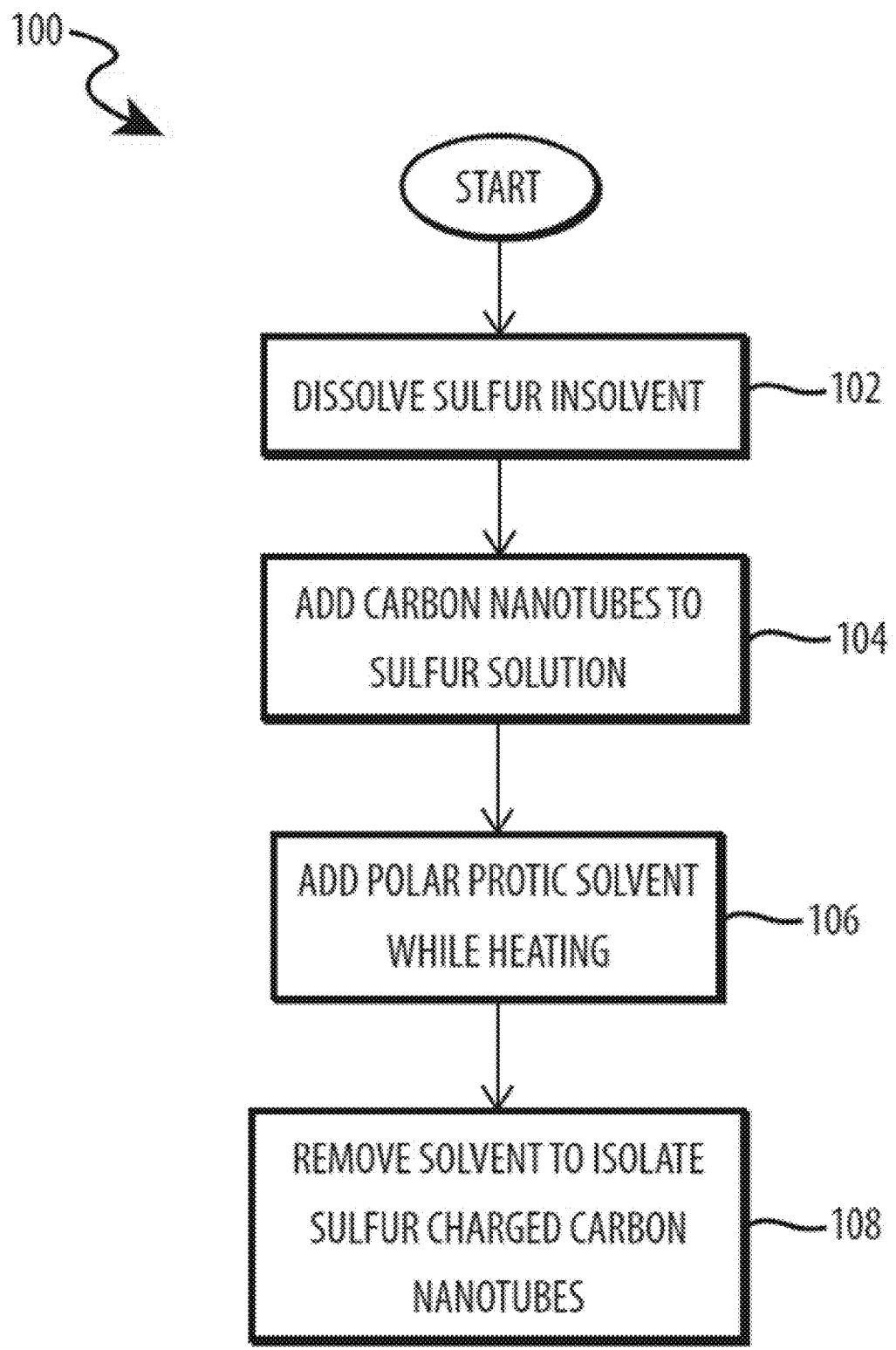
FIG. 1 is a flow diagram depicting operational steps for producing sulfur charged carbon nanotubes.

Embodiments described herein provide methods for creating sulfur charged carbon nanotubes, which may be used in Li—S battery cathodes. As described in further detail below, encapsulating sublimed sulfur in carbon nanotubes may compensate for the poor electrical conductivity of sulfur without sacrificing the increased capacity of sulfur cathodes. Additionally, the carbon nanotubes allow for polysulfides to form, providing a diffusion path for lithium ions, while reducing the ability of the polysulfides to branch into the electrolyte solution toward the anode and short the battery. Embodiments described herein enable, among other things, low cost, high yield, and scalable methods of producing sulfur charged carbon nanotube cathodes for use in Li—S batteries Turning now to the figures, FIG. 1 is a method, generally designated 100, depicting operational steps for producing sulfur charged carbon nanotubes. In operation 102, sulfur is dissolved in a solvent. In various embodiments, the sulfur may be sublimed elemental sulfur. The solvent may be any suitable solvent. In one embodiment, the solvent is carbon disulfide ($CS_2$). In various embodiments, the amount of sulfur may be determined based on the amount of solvent and the amount of sulfur charged carbon nanotubes desired. For example, the sulfur may be approximately 50% wt-98% wt of the combined sulfur-nanotube mixture. In certain embodiments, one gram of sublimed sulfur may be added for every five ml of $CS_2$. Those skilled in the art will appreciate that different combinations are possible so long as the sulfur is completely dissolved in the solvent. The sulfur and solvent may be stirred, sonicated, and/or heated in order to increase the solubility of the sulfur in the solvent and/or ensure even dispersion of the sulfur in the solution. In certain embodiments, the solution may be heated to 32°-33° C. while stirring.

In operation 104, carbon nanotubes are added to the sulfur solution. The quantity of carbon nanotubes may be depend on the desired final composition of the sulfur charged carbon nanotubes. In various embodiments, the amount of nanotubes may be approximately 2% wt-50% wt of the combined sulfur-nanotube mixture. In various embodiments, the carbon nanotubes may be any of single wall, soluble wall, and/or multiwall nanotubes. In some embodiments, the nanotubes are less than 10 nm in diameter. In some embodiments, the nanotubes are less than 5 µm in length. In other embodiments, the nanotubes are less than 3 µm in length. In various embodiments, reducing the length of the nanotubes can reduce bundling of the nanotubes and provide more even coatings when applied to an electrode material. The type of carbon nanotube may be selected based on the desired electrical properties of the resulting cathode. The mixture containing the sulfur, solvent, and nanotubes may be sonicated and/or stirred to evenly disperse the carbon nanotubes in the mixture. By first dissolving the sulfur in the solvent, the carbon nanotubes are filled with sulfur by nanocapillary action. Capillary action is the ability of a liquid to fill a narrow space without (or in contravention of) external forces working on the liquid (e.g., gravity). In small diameter tubes, such as carbon nanotubes, capillary action results from intermolecular forces within the liquid (e.g. surface tension) and adhesive forces between the liquid and the nanotube.

In operation 106, a polar protic solvent is added while heating the sulfur-nanotube mixture. In various embodiments, the polar protic solvent may be methanol, isopropyl alcohol, ethanol, and distilled water. In certain embodiments, the polar protic solvent may be added at a controlled rate (e.g., drops at a rate of 1 ml/min). The sulfur-nanotube mixture may be stirred and/or heated while adding the polar protic solvent. For example, the mixture may be heated to a temperature of 33°-35° C. By varying the rate at which the polar protic solvent is added to the solution, the size of sulfur particles may be controlled. Additionally, the polar protic solvent may facilitate a pi bond between sulfur particles and the carbon nanotubes, allowing sulfur to bond to the outside of the nanotubes in addition to filling the nanotubes via the nanocapillary action described above. By attaching sulfur to the outside of the carbon nanotubes, the cyclability and capacity of a resulting Li—S battery may be increased.

In operation 108, the solvent (i.e., the solvent described above with respect to operation 102) is removed to isolate the sulfur-carbon nanotube product. The solvent may be removed by any means that does not damage the sulfur-carbon nanotube product. In certain embodiments, the sulfur-carbon nanotube mixture may be heated (e.g., to 35° C.) to evaporate a portion of the solvent until a moist mixture remains. The remaining moist mixture may be spread on a tray to air dry and allow any remaining solvent to evaporate. A two-stage drying process, as described herein, may help the resulting sulfur-carbon nanotube product maintain a particulate form, which can facilitate later processing steps. In certain embodiments, the resulting sulfur-carbon nanotube product may be ground into fine particles to facilitate later processing steps. In various embodiments, the evaporated solvent may be captured and reused in future processes, thereby reducing unusable byproducts produced in fabricating sulfur charged nanotubes. The embodiment of FIG. 1 produces particulate sulfur-charged nanotubes with sulfur filling the carbon nanotubes and attached to the exterior of the nanotubes. The structure of the resulting sulfur charged carbon nanotubes is described in further detail below with respect to FIGS. 3 and 4.

Figure 2:
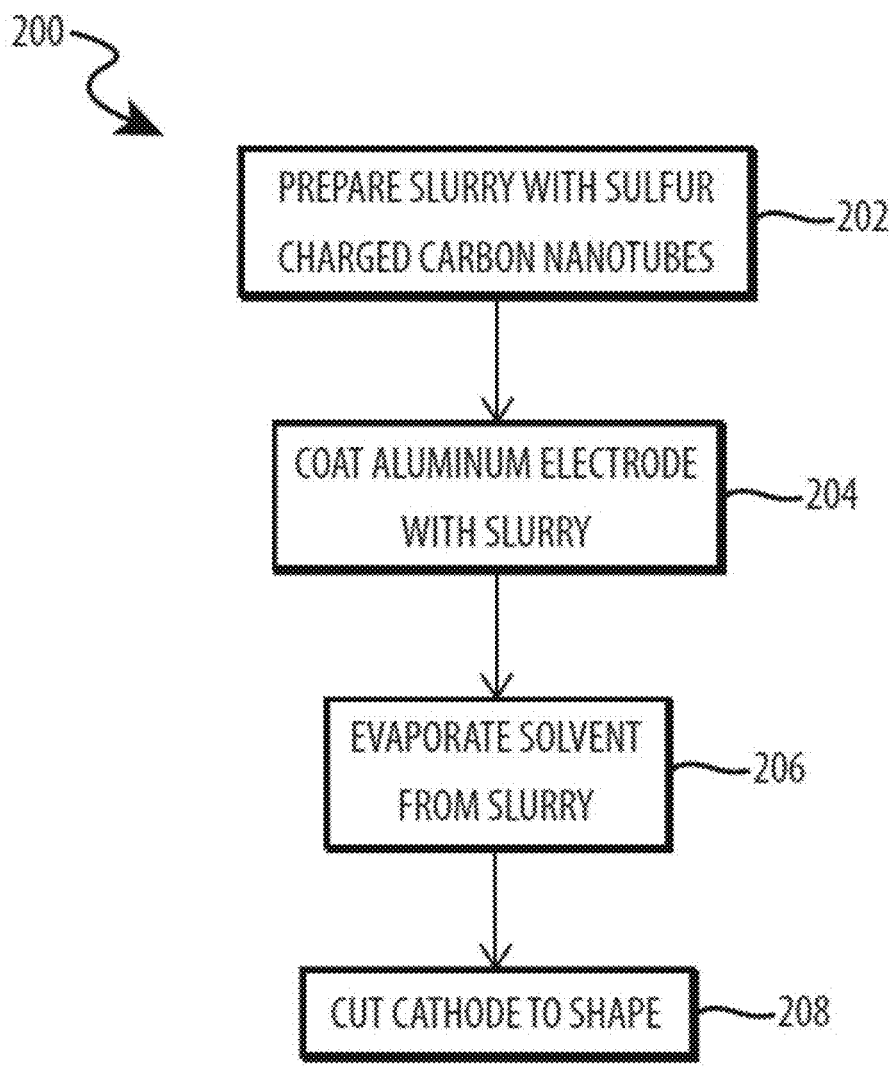
FIG. 2 is a flow diagram depicting operational steps for producing a sulfur-charged carbon nanotube cathode for use in a lithium ion battery.

FIG. 2 is a method, generally designated 200, depicting operational steps for producing a sulfur charged carbon nanotube cathode for use in a lithium ion battery. The embodiment of FIG. 2 provides a process by which Li—S cathodes may be produced using sulfur charged carbon nanotubes, such as those described above with respect to FIG. 1.

In operation 202, a slurry is prepared with a sulfur charged carbon nanotubes. The slurry may include, for example, a binding agent, such as poly(acrylonitrile-methyl methacrylate), a conductive carbon additive, and a solvent, such as N-methylpyrrolidinone. The binding agent may adhere the sulfur charged carbon nanotubes to one another. The conductive carbon additive may increase the conductivity of the resulting cathode. The solvent may be used to achieve a desirable viscosity of the slurry to ease the manufacturing product and ensure an even coating of the sulfur charged carbon nanotubes on the cathode.

In operation 204, an aluminum electrode is coated with the slurry. In various embodiments, the aluminum electrode may be a sheet of aluminum foil. The slurry coating may have a thickness of approximately 20-50 μm. The binding agent described above with respect to operation 202 may also act to bind the slurry to the aluminum electrode. The coated electrode may optionally be compressed using a roll press to achieve a desired thickness of the slurry coating. Those skilled in the art will appreciate that varying the thickness of the slurry, and, therefore, the layer of sulfur charged carbon nanotubes, the properties of the resulting cathode may be adjusted. For example, increasing the thickness of the sulfur charged carbon nanotubes may increase the amount of lithium that may penetrate the cathode. In operation 206, the solvent (i.e., the solvent added in operation 202) is evaporated from the cathode. The solvent may be evaporated using any appropriate mechanism. In one embodiment, the aluminum electrode with slurry coating are placed in an oven and heated to a temperature of approximately 60° C. for a sufficient amount of time to evaporate substantially all of the solvent from the slurry. In operation 208, cathodes may be cut to shape from the sulfur charged carbon nanotube coated aluminum electrode. For example, cathodes may be cut to shape for use in button (coin) cells, pouch cells, etc.

The cathodes produced according to the method of FIG. 2 may be used in a Li—S battery having a silicon and/or germanium anode and an electrolyte to facilitate lithium shuttling. The electrolyte may include Lithium nitrate ($LiNO_3$), N-Diethyl-N-methyl-N-(2-methoxyethyl)ammonium bis(trifluoromethanesulfonyl)imide (DEMMOX), dimethyl ether (DME) and 1,3-dioxolane (DOL). For example, the electrolyte may include 0.25 $E^3$ mol $g^{-1}$ of $LiNO_3$ ($LiNO_3$=68.95 g $mol^{-1}$), 0.25 $E^3$ mol $g^{-1}$ of DEMMOX (DEMMOX=466.4 g $mol^{-1}$), and a 1:1 (wt.) mixture of DME and DOL.

Figure 3:
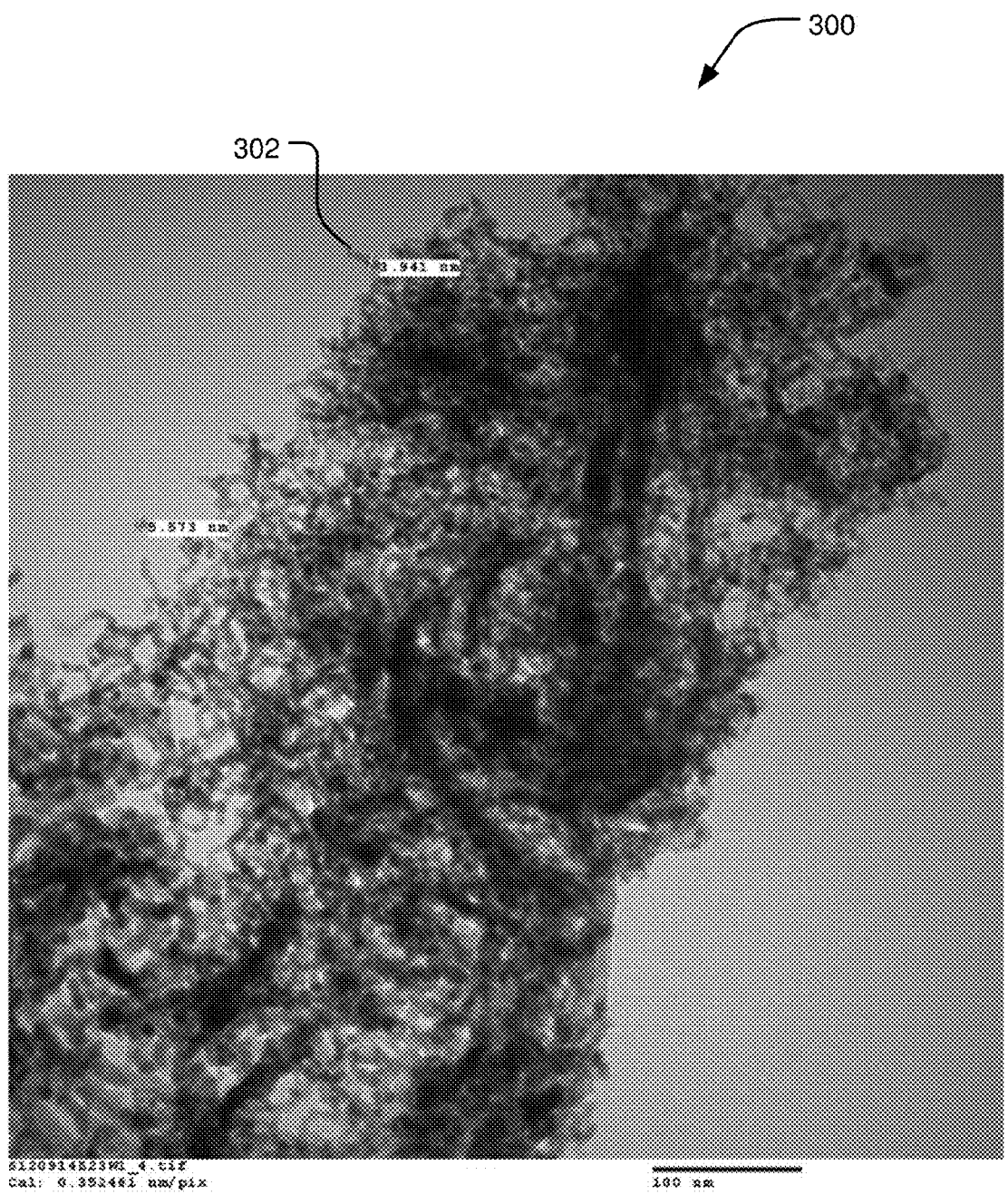
FIG. 3 is a magnified view of sulfur-charged carbon nanotubes on a cathode according to the embodiment of FIG. 2.

FIG. 3 is a sulfur charged carbon nanotube cathode, generally designated 300, according to the embodiment of FIG. 2. The cathode 300 may include a plurality of sulfur charged carbon nanotubes 302. In various embodiments, the sulfur charged carbon nanotubes may coat an electrode material, such as aluminum in a substantially even layer of between approximately 20-50 μm. The sulfur charged carbon nanotubes provide a cathode with the energy density of a Li—S battery, while containing the sulfur particles and preventing polysulfides from bridging the gap between the cathode and anode to short the battery.

Figure 4:
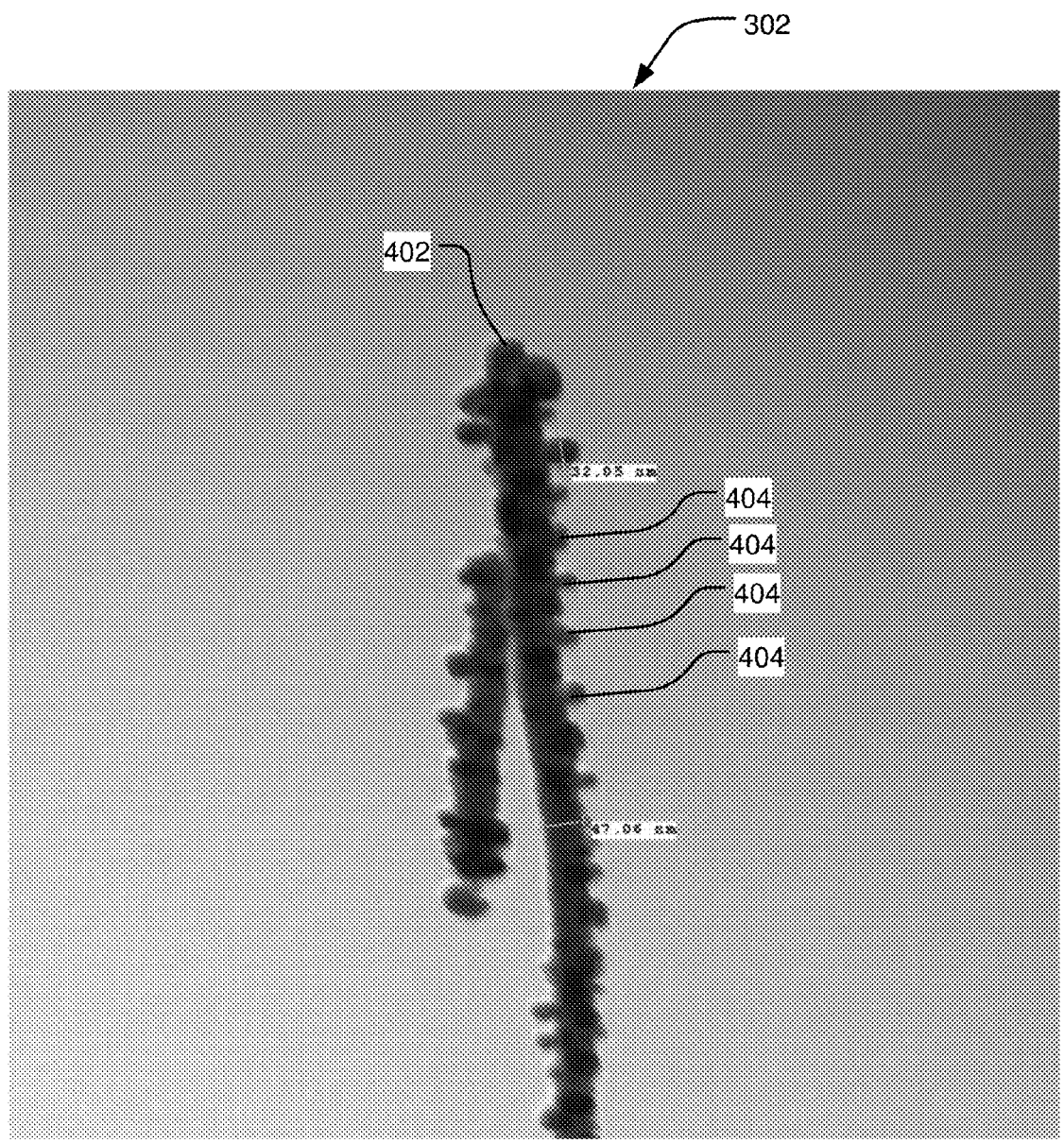
FIG. 4 is a magnified view of a sulfur-charged carbon nanotube in accordance with the embodiment of FIG. 3.

FIG. 4 depicts the sulfur charged carbon nanotube 302. The sulfur charged carbon nanotube 302 includes a carbon nanotube 402 and a plurality of sulfur particles 404 attached to the outside of the carbon nanotube 402. In various embodiments, the carbon nanotube 402 may also be filled with sulfur particles 404. As discussed above with respect to FIG. 1, the size of the sulfur particles may be controlled based on the rate at which the polar protic solvent is added to the sulfur-carbon nanotube mixture. In the depicted embodiment, the sulfur particles are approximately 30-35 nm in diameter, and the carbon nanotube 402 charged with internal sulfur particles is approximately 45-50 nm in diameter. Those skilled in the art will appreciate that other sizes of sulfur particles 404 and carbon nanotubes 402 are possible. In various embodiments, the carbon nanotube 402 may be porous (e.g., the sulfur in the carbon nanotubes stretches the carbon bonds creating "holes" in the carbon nanotubes), allowing for Li-ion diffusion during charging/discharging cycles.

Figure 5:
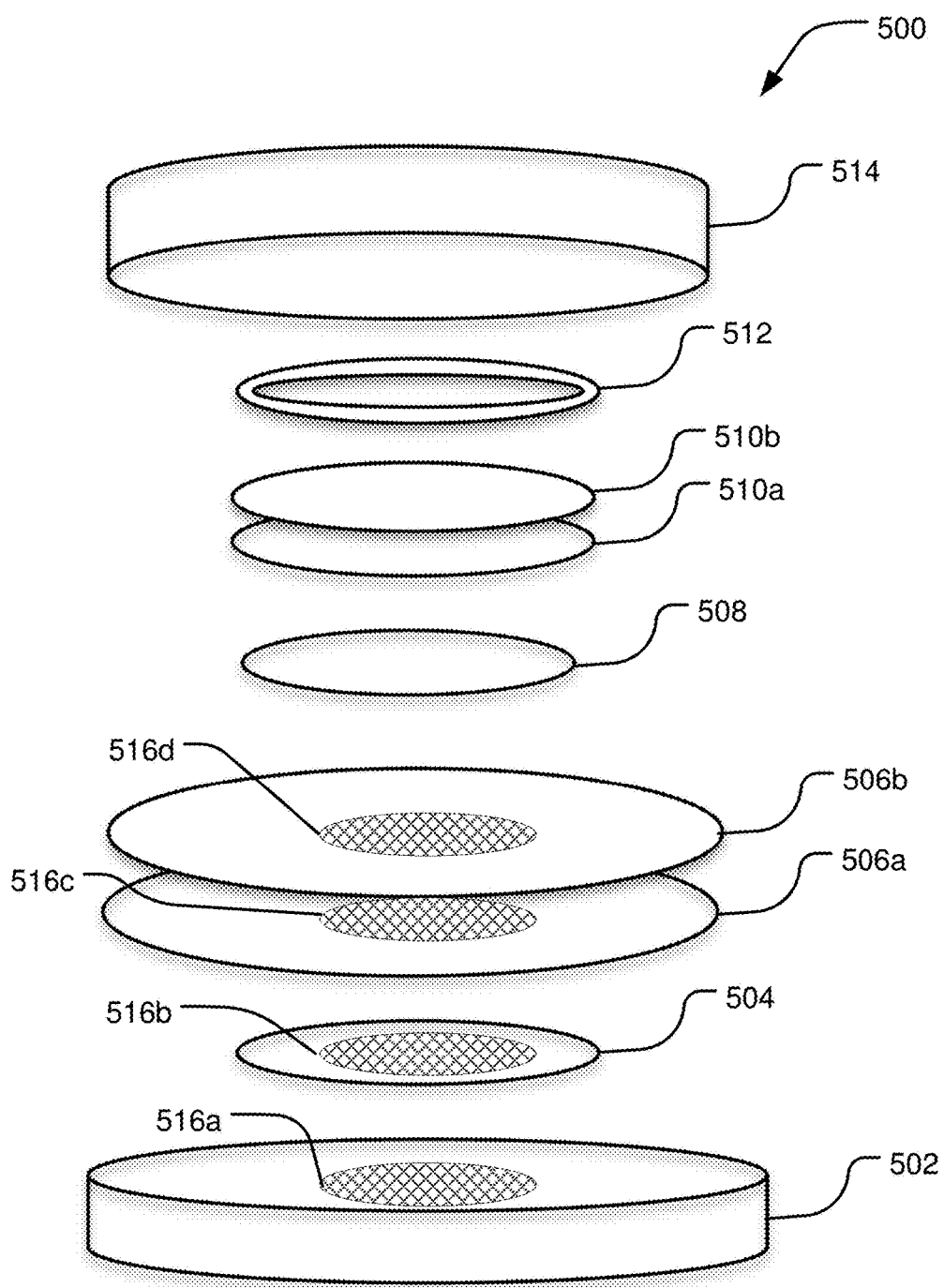
FIG. 5 is a schematic diagram of a half-cell incorporating a sulfur charged carbon nanotube cathode.
Figure 6:
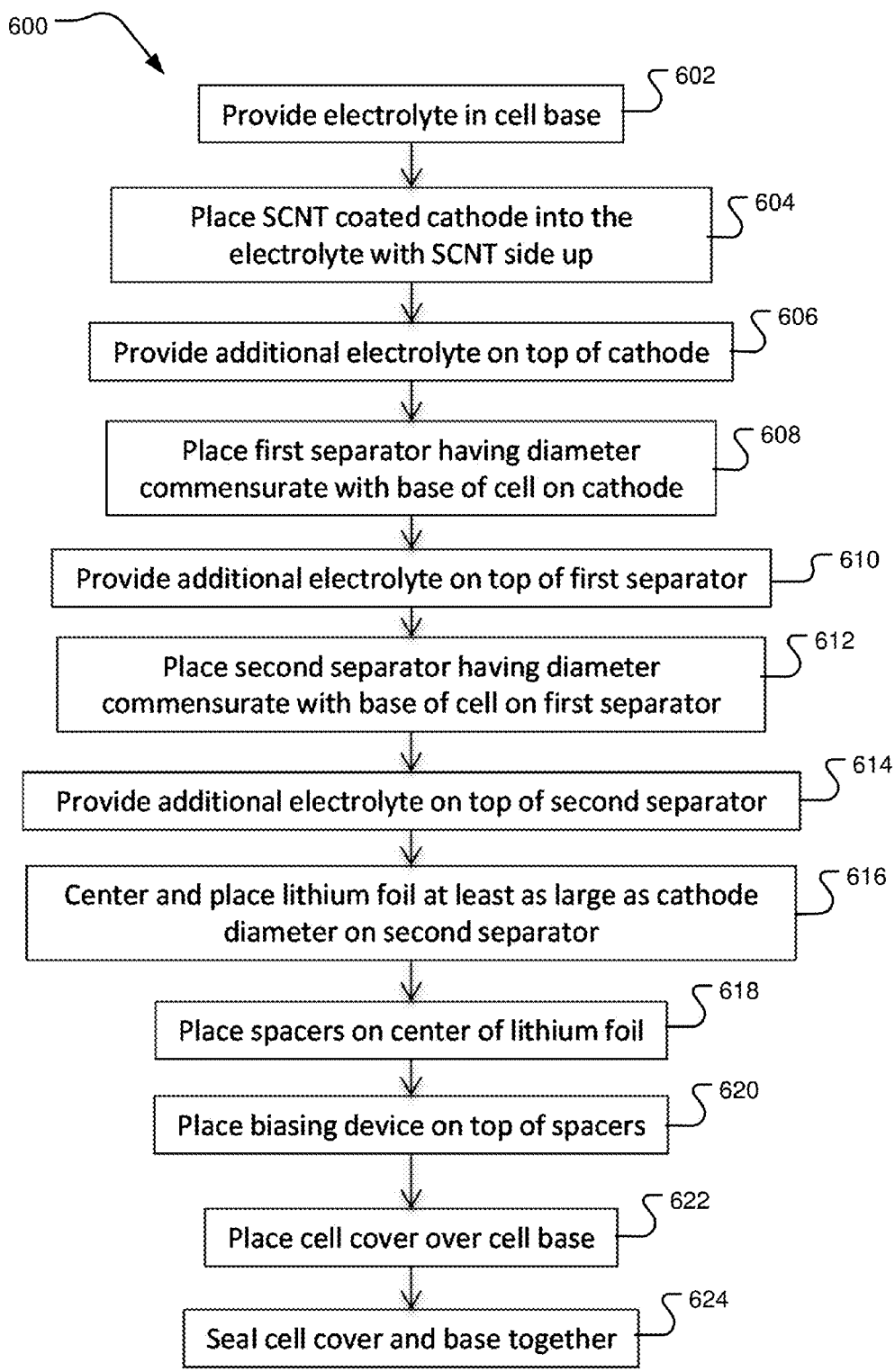
FIG. 6 is a flow diagram of a process for manufacturing a half-cell incorporating a sulfur-charged carbon nanotube cathode.

Turning now to FIGS. 5 and 6, FIG. 5 is a schematic view of a half-cell cathode, generally designated 500, for use in a coin cell. FIG. 6 is a method, generally designated 600 for assembling a half-cell cathode in accordance with the embodiment of FIG. 5. The half-cell cathode may include a cell base 502, a sulfur charged carbon nanotube cathode 504, one or more separators 506a/b, lithium foil 508, one or more spacers 510a/b, a biasing device 512, and a cell cover 514.

In step 602, an electrolyte 516a is provided to the cell base 502. The electrolyte may be, for example, 0.25 $E^{-3}$ mol $g^{-1}$ of $LiNO_3$ ($LiNO_3$=68.95 g $mol^{-1}$), 0.25 $E^{-3}$ mol $g^{-1}$ of DEMMOX (DEMMOX=466.4 g $mol^{-1}$), and a 1:1 (wt.) mixture of DME and DOL. In one embodiment, 25 µL of the electrolyte 516a is provided to the center of the cell base 502. In step 604, the sulfur charged carbon nanotube cathode 504 is placed into the electrolyte 516a. In various embodiments, the cathode is placed with the aluminum contact of the cathode 504 toward the cell base 502 and the sulfur charged carbon nanotube coated side away from the cell base 502. In step 606, additional electrolyte 516b is provided on top of the sulfur charged carbon nanotube side of the cathode 504. In one embodiment 25 µL of electrolyte 516b is provided on top of the cathode 504.

In step 608, a first separator 506a is placed on top of the electrolyte solution and the cathode 504. In various embodiments, the first separator 506a may have a diameter commensurate with the diameter of the cathode 504. In certain embodiments, the first separator 506a may be a 19 mm polypropylene separator. In step 610, additional electrolyte 516c is provided on top of the first separator 506a. In one embodiment 25 µL of electrolyte 516c is provided on top of the first separator 506a. In step 612, a second separator 506b is placed on top of the electrolyte solution 516c and the first separator 506a. In various embodiments, the second separator 506b may have a diameter commensurate with the diameter of the first separator 506a. In certain embodiments, the second separator 506b may be a 19 mm polypropylene separator. In step 614, additional electrolyte 516d is provided on top of the second separator 506b. In one embodiment 25 µL of electrolyte 516d is provided on top of the second separator 506b.

In step 616, a disc of lithium foil 508, that is at least as large as the cathode diameter, is centered and placed on the electrolyte 516d on the second separator 506b. In various embodiments, the disc of lithium foil 508 may completely cover the cathode 504. In step 618, the one or more spacers 510a/b are placed on top of the lithium foil 508. In various embodiments, the spacers 510a/b may be stainless steel spacers. In various embodiments, two spacers 510a/b are placed on the lithium foil 508. In step 620, the biasing device 512 is placed on top of the spacers 510a/b. In various embodiments, the biasing device 512 may be a spring washer. In other embodiments, the biasing device 512 may be any other type of biasing device that does not interfere with the electrical properties of the half-cell cathode 500. In step 622, the cell cover 514 is placed over the cell base 502 to enclose the contents of the half-cell cathode 500. In various embodiments, enclosing the half-cell cathode 500 may cause electrolyte to leak from the half-cell cathode 500. Any electrolyte may be removed from the outside of the half-cell cathode 500. In step 624, the cell cover 514 and the cell base 502 are sealed together to create a complete half-cell cathode 500. The half-cell cathode 500 may be used to make a full coin cell as described in further detail below with respect to FIGS. 15 and 16.

Lithium Ion-Intercalated Nanocrystal Anodes

Silicon and germanium crystals can theoretically accommodate large numbers of lithium ions. The atomic ratio of Li atoms that can be utilized by Si or Ge atoms is 4.4:1. (or 22 Li:5 Si or Ge). Lithium ions are small enough to fit in between the spaces of the atoms making up a silicon or germanium crystal lattice. Further, germanium is inherently able to accept lithium ions at a faster rate than other proposed anode materials this has been empirically verified with test data. Lithium-ion diffusivity into Ge is 400 times faster than silicon and nearly 1000 times faster than standard Li-ion technology.

Figure 7A:
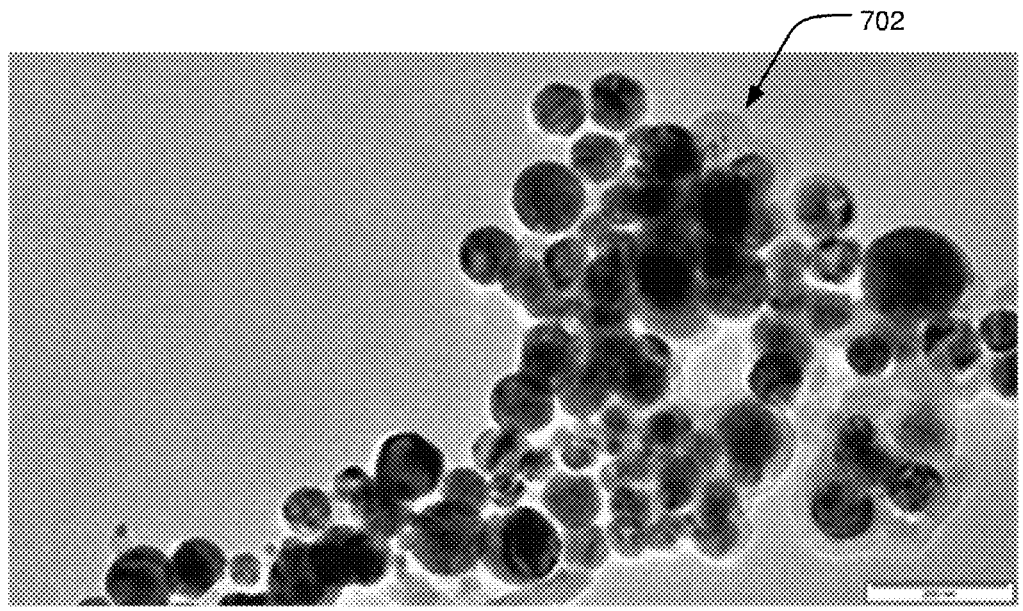
FIG. 7A is a magnified image of a collection of pristine germanium nanocrystals
Figure 7B:
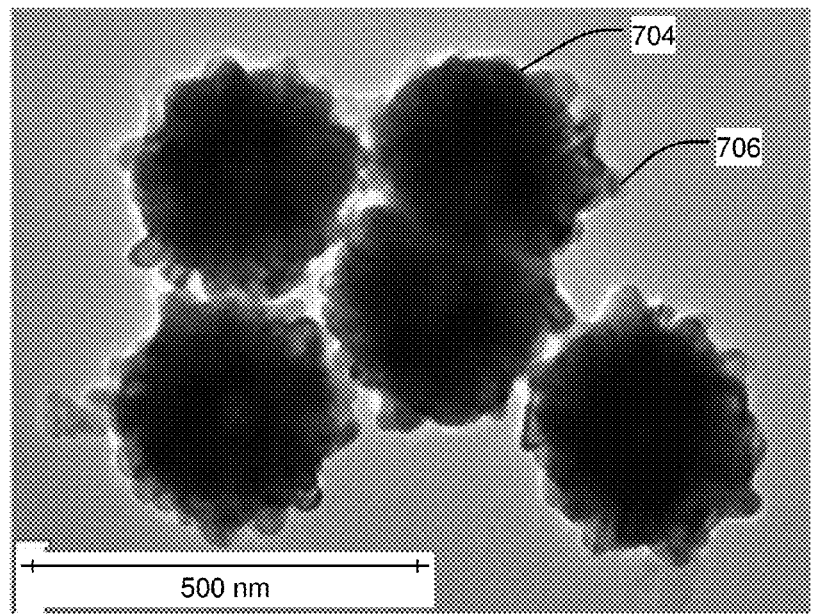
FIG. 7B is a magnified image of a collection of germanium nanocrystals post intercalation with lithium atoms exhibiting expansion and a nanopore morphology.

FIG. 7A is a micrograph of a group of germanium nanocrystals 702 in a pure state. A further magnified image of pure germanium nanocrystals is shown in FIG. 7B. The general form is highly spherical, indicating a high quality, uniform crystal formation conducive to maximizing the diffusive packing of lithium ions. Further, the surface morphology indicates a number of distended protrusions 706 on each of the nanocrystals 704. This morphology translates into a significantly larger surface area for germanium nanocrystals as compared to silicon or other similar nanoscale crystal structures. The greater surface area is advantageous to promoting more rapid diffusion of lithium ions into the crystal lattice during recharge cycles. In fact, the conductivity of Ge is 10,000 times higher than that of Si, and the diffusivity of Li ion in Ge is 400 times faster than that of Si at room temperature, i.e., the recharge rate for Ge is 400 times faster than the recharge rate for Si.

Figure 7C:
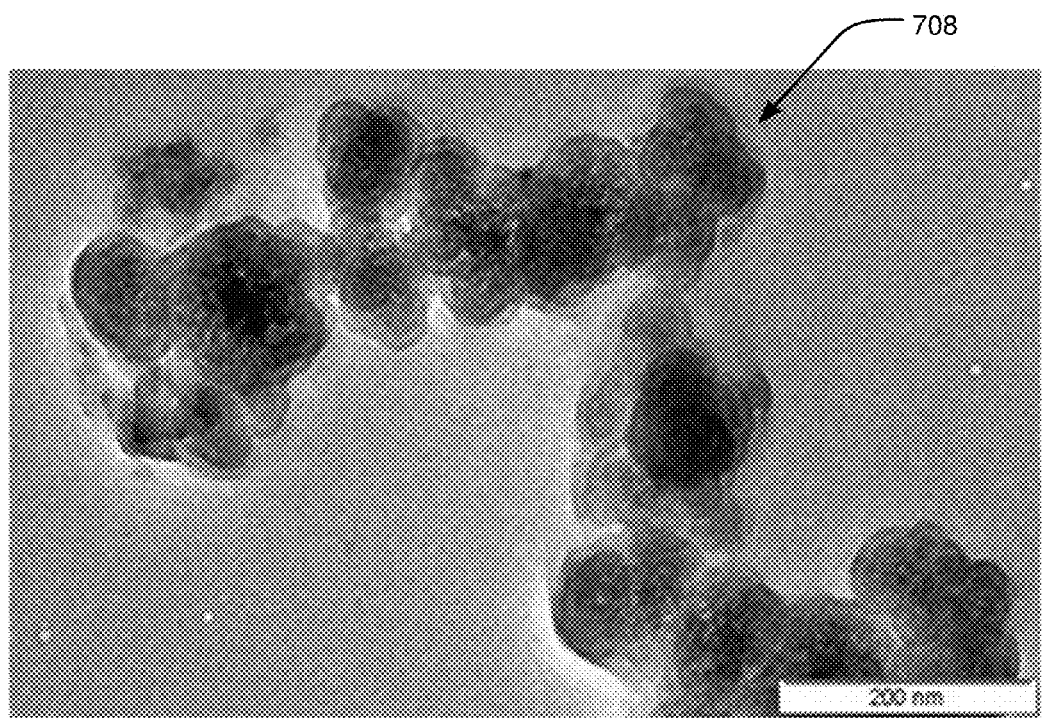
FIG. 7C is a magnified micrograph image of a group of germanium nanocrystals.

FIG. 7C depicts a micrograph of group of lithiated germanium nanocrystals 708 similar in scale to the pure nanocrystals 702 of FIG. 7A. Comparison of the morphology of the pure nanocrystals 702 to the lithiated nanocrystals 708 indicates the expansion of the crystal lattice to accept the high ratio of lithium ions. In particular, the lithiated germanium nanocrystals 708 exhibit a nanoporous structure caused by the expansion of the nanocrystal lattice to accommodate the lithium ion intercalation. For high quality (spherically uniform) Ge nanocrystals, the expansion is isotropic, which minimizes strain on the crystal lattice structure and allows for very high cycle rates and minimizes irreversible capacity loss. Conversely, large nanocrystals of silicon typically expand anisotropically and therefore are subject to rapid capacity loss after only several cycles. However, if the Si nanocrystals are formed small enough (i.e., <100 nm and preferably <50 nm) the crystal structure is more uniform and expansion behaves more isotropically, causing less stress on the nanocrystal structure and thus increasing the cycling capacity.

In a lithium ion battery, the lithium source needs to be in the anode or the cathode; it cannot be in both. A charged battery contains all of the lithium in the anode. Commercially available batteries typically have all of the lithium stored in the cathode in the form of a lithium metal oxide, i.e., lithium cobalt oxide or lithium manganese oxide or similar. At the end of the manufacturing process for Li-ion batteries, all of the batteries have to be cycled at least once for the lithium to be inserted into the anode so that the battery is already charged when a consumer purchases it in a store. Lithium-metal-oxide cathodes have very limited capacity, on the order of 200-300 mAh/g at best.

If an anode, such as germanium, has an energy capacity of 1000 mAh/g, it cannot be effectively paired with commercially available cathodes. Because of the diffusion limits of lithium, one cannot simply add 4-5 times as much cathode material to compensate for an equal volume of anode material. In view of this dilemma, the present disclosure describes cost effective processes for the creation prelithiated, high energy density anode materials for pairing with practical and low cost cathode materials (e.g., sulfur) that will readily accept the lithium stored in the anode. The anode of the full battery cell thus has lithium already combined/contained within the silicon or germanium nanocrystals, alleviating the need for a lithium compound cathode and an initial cycle to charge the battery for first use.

In exemplary embodiments, the anodes described herein may comprise nanocrystal ("NC") structures of silicon (Si), germanium (Ge), or silicon-germanium (SiGe) described herein intercalated with lithium ions (Li+) (sometimes abbreviated herein "Li—SiNC," "Li—GeNC," and "Li—SiGeNC," respectively), and any combination thereof. As used herein, the terms "intercalation" or "diffusion" or "alloy" when referring to lithium intercalation into SiNC, GeNC, and/or SiGeNC as described herein refers to both intercalation into the crystal lattice of discrete nanocrystals and intercalation between nanocrystals. These lithiated nanocrystals are then bound to a conductive substrate to form a structurally viable anode. In the exemplary anode structures and manufacturing processes described herein, the nanocrystals need to be of "high quality" in order to achieve the significant anode lithiation results disclosed herein. High quality in the case of Si and Ge nanocrystals for use in lithium-ion battery anodes means below that Si nanocrystals have diameters of less than 150 nm and are substantially spherical in shape and that Ge nanocrystals have diameters less than 500 nm and are substantially spherical in shape. The smaller the diameter of the nanocrystal, the greater the packing factor in the film, thus resulting in greater energy density. A higher packing factor can be achieved with bimodal and trimodal distributions e.g., 50 nm, 17 nm, 6.5 nm nanocrystal size distributions.

In some embodiments, cells, batteries, and similar devices described herein may comprise unstrained SiGeNC and/or GeNC. In some embodiments, the batteries and similar devices described herein may comprise strained SiGeNC and/or strained GeNC. As used herein, the terms "strained SiGeNC" and "strained GeNC" refers to SiGeNC and/or GeNC having a strained crystal structure, which is marked by a shift in a crystal plane when analyzed by x-ray diffraction. Strained SiGeNC and GeNC referenced herein may, in some embodiments, have a 2θ value for the (111) crystal plane shifted relative the (111) crystal plane of bulk silicon from a lower limit of about 1°, 2°, or 3°, or 4° to an upper limit of about 8°, 7°, 6°, 5°, or 4°. The shift may range from any lower limit to any upper limit and encompass any subset therebetween.

Unless otherwise specified, the terms "SiGeNC" and "GeNC" encompass both unstrained and strained structures thereof. Further, as described herein, the SiGeNC and GeNC having the various properties and/or characteristics described herein (e.g., 2θ value shift, average diameter, and the like) may be used to produce Li—SiGeNC and Li—GeNC, respectively. As such, it should be understood that the properties of the SiGeNC and GeNC described herein may extend to the Li—SiGeNC and Li—GeNC described herein.

In some embodiments, the SiGeNC described herein may comprise a mole ratio of silicon to germanium that ranges from a lower limit of about 1:10, 1:5, or 1:1 to an upper limit of about 10:1, 5:1, or 1:1, and wherein the mole ratio may range from any lower limit to any upper limit and encompasses any subset therebetween.

In some embodiments, the SiNC, SiGeNC, and/or GeNC described herein may be p-doped or n-doped. In some embodiments, the SiGeNC may be in a "core-shell" configuration with a germanium lattice core surrounded by a silicon lattice shell. In some embodiments, the SiGeNC may merely be a combination or mixture of separate SiNCs and GeNCs.

In some embodiments, the SiNC, SiGeNC, and/or GeNC described herein may have an average diameter in at least one dimension ranging from a lower limit of about 3 nm, 5 nm, 10 nm, 25 nm, or 100 nm to an upper limit of about 1000 nm, 500 nm, 250 nm, 150 nm, 100 nm, or 50 nm. The average diameter in at least one dimension may range from any lower limit to any upper limit and encompasses any subset therebetween. In particular, SiNC may be under 150 nm diameter and preferably under 50 nm. Germanium nanocrystals may be under 1000 nm in diameter and preferably under 100 nm. Above these diameters the, nanocrystals may not maintain long range order after several lithiation-dilithiation cycles and the materials become amorphous.

In some embodiments, the SiNC, SiGeNC, and/or GeNC described herein may have a narrow diameter distribution such that the standard deviation from the average diameter ranges from a lower limit of ± about 0.5 nm, 1 nm, or 2 nm to an upper limit of ± about 10 nm, 7 nm, or 5 nm. The standard deviation may range from any lower limit to any upper limit and encompasses any subset therebetween.

Figure 8:
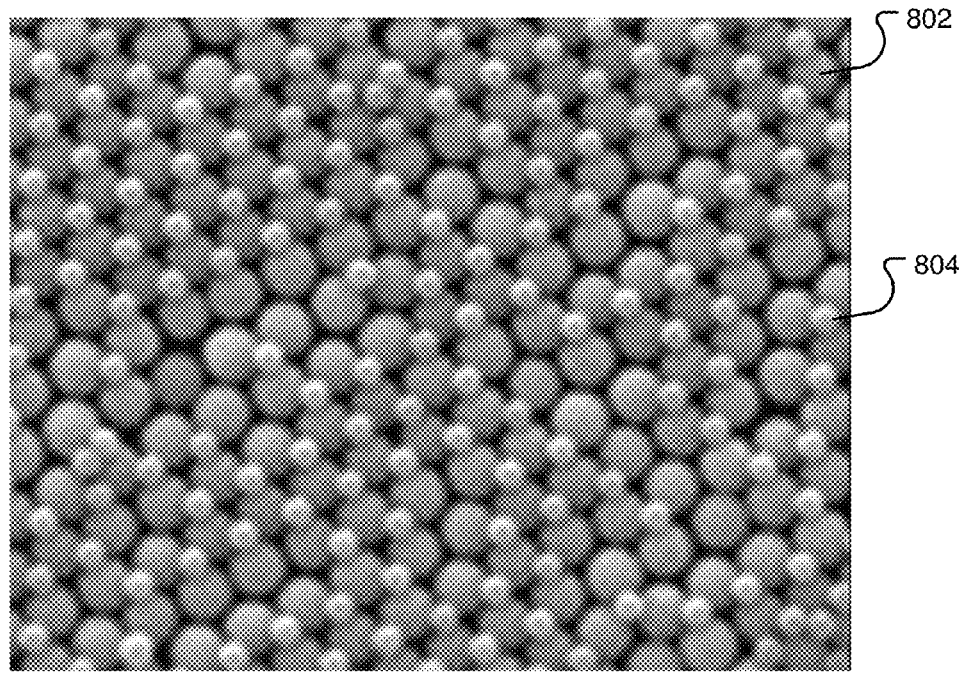
FIG. 8 is a magnified micrograph image of a germanium nanocrystal deposition having a bimodal distribution of nanocrystals of two different diameters.

In some embodiments, the SiNC, SiGeNC, and/or GeNC described herein may have a multimodal diameter distribution (e.g., bimodal, trimodal, and so on). It is desirable to have a range of sizes from as-small-as-possible to the upper limits of SiNC and GeNC noted above in order to increase the packing density of the nanocrystals on a conducting anode substrate and thus maximize the diffusion density of lithium ions within and between the nanocrystals. An example of a self-organizing bimodal distribution 800 of two different sizes of germanium nanocrystals is depicted in the micrograph of FIG. 8. As shown, the larger-sized nanocrystals 802 (e.g., 50 nm diameter) arrange to form a base layer on a substrate while the smaller-sized nanocrystals 804 (e.g., 12 nm diameter) arrange in the spacing between the larger-sized nanocrystals 802. In this way, the density of the nanocrystals is increased.

In exemplary embodiments, the SiGeNC and/or GeNC described herein having a multimodal diameter distribution may have at least one mode with an average diameter in at least one dimension ranging from a lower limit of about 4 nm, 7 nm, 12 nm, or 25 nm to an upper limit of about 250 nm, 150 nm, 100 nm, or 50 nm. The average diameter in at least one dimension may range from any lower limit to any upper limit and encompasses any subset therebetween. In some embodiments, the modes of a multimodal diameter distribution of the SiNC, SiGeNC, and/or GeNC described herein may independently have a narrow diameter distribution such that the standard deviation for each mode independently ranges from a lower limit of ± about 0.5 nm, 1 nm, or 2 nm to an upper limit of ± about 10 nm, 7 nm, or 5 nm. The standard deviation may range from any lower limit to any upper limit and encompasses any subset therebetween.

In some embodiments, the Li—SiGeNC and Li—GeNC described herein may have a mole ratio of Li to SiGe (i.e., the combined moles of Si and Ge) or Li to Ge, respectively, ranging from a lower limit of greater than 0, about 0.2, 0.5, 1, 1.5, or 2 to an upper limit of about 3.6, 3.5, 3.25, 3, 2.5, 2, or 1.5. The mole ratio of Li to SiGe or Li to Ge may range from any lower limit to any upper limit and encompasses any subset therebetween. It should be noted that such mole ratios are described in terms of a fully charged battery or other similar device. The mole ratio of Li to SiGe or Li to Ge may depend on, inter alia, the ratio of the lithium source to the SiGeNC and/or GeNC in the synthesis of the Li—SiGeNC and/or Li—GeNC.

In some embodiments, lithium intercalation may be effected at least one of: mixing the SiGeNC and/or GeNC with lithium metal (e.g., folding the two together and allowing the lithium to intercalate), mixing the SiGeNC and/or GeNC with lithium metal in the presence of an ionic liquid, electrodepositing the SiGeNC and/or GeNC on lithium metal electrode, and the like. In some embodiments, the ionic liquid and electrodeposition may be used in combination.

In some exemplary implementations, elemental lithium from a lithium metal electrode intercalates into the SiNC, SiGeNC, and/or GeNC attracted to the surface thereof such that a paste of lithiated nanocrystals and ionic liquid forms on the lithium metal electrode. The paste has a dark-brown to purple-black color depending on the amount of lithium present. It has been observed that the paste of Li—SiGeNC and/or Li—GeNC is stable in air for extended periods of time and may be exposed to water without reaction unlike lithium metal. The intercalation of the lithium ions within the nanocrystal structures protects the lithium from interaction with air and moisture. Further, in the case of GeNCs, germanium does not form surface oxides in air like silicon, which further improves the diffusion speed of lithium ions.

Once formed, the lithiated nanocrystal paste may be used in further anode manufacturing processes without need for a protective environment (e.g., an argon-filled enclosure), which can significantly reduce the cost and difficulty of the process. Further, the nonvolatile paste may advantageously enable batteries and similar devices with minimal to no risk of fire in the event of battery damage that exposes the anode to air or water. Such an advantage and risk mitigation may be exploited in the production of lighter-weight batteries because the battery casings may be made of different materials, which may be useful in electric vehicles where much of the battery weight can be attributed to protection from puncture in crashes.

In some embodiments, the anode may comprise a conductive support having a film disposed thereon, the film comprising the nanocrystals described herein. Examples of the conductive supports may include, but are not limited to, silicon, germanium, graphite, nickel, iron, stainless steel, aluminum, copper, and the like, and any combination thereof. In some embodiments, the conductive support may be in a form that is at least one of the following: a sheet, a foil, a grid, a rod, and the like, and any hybrid thereof, which may, inter alia, depend on the configuration of the battery or other device in which the anode is to be used.

In some embodiments, the film may consist essentially of the nanocrystals described herein. In other embodiments, the film may comprise the nanocrystals described herein and optionally further comprise binders and/or existing anode materials. These optional components may be used to achieve the desired physical characteristics of the film and/or the precursor thereof. Examples of physical characteristics may include, but are not limited to, the rheology of the film precursor, the drying characteristics of the film precursor, the film plasticity, the film conductivity, the adhesion strength of the film to the conductive support, and the like, and any combination thereof.

In some embodiments, binders may be useful in achieving the desired physical characteristics of an anode film or precursor thereof by adhering the nanocrystals together or to a conductive support. The binders may minimally, if at all, impact the electrochemistry of the resultant battery or similar device in which the anode is used. Binders may be conductive or insulating. Examples of binders may include, but are not limited to, polyvinylidene fluoride, N-methyl-2-pyrrolidone, carboxymethyl cellulose, agar, styrene-butadiene rubber, polytetrafluoroethylene, conductive acetylene black, conductive graphite powders, and the like, and any combination thereof. In some embodiments, the binder may be selected to enable a hydrogel or organogel film (e.g., crosslinked agar or carboxymethyl cellulose). In some embodiments, the binder may be selected to enable a printable film precursor that dries like ink (e.g., conductive graphite powder). In some embodiments, the binder may be selected to enable a flexible, dry film (e.g., styrene-butadiene rubber or polytetrafluoroethylene).

Existing anode materials may be useful in achieving the desired physical characteristics of the film or precursor thereof and may participate in the electrochemistry of the resultant battery or similar device in which the anode is used. In some embodiments, the use of existing anode materials may be minimized or eliminated because they provide little to no enhancement to the anode properties and occupy volume that could otherwise be filled by nanocrystals described herein. Examples of existing anode materials may include, but are not limited to, graphite powder, carbon microbeads, $Li_4Ti_5O_{12}$, $LiVPO_4F$, and the like, and any combination thereof.

The concentration of the various components in the film precursor may be at levels necessary to achieve the desired physical characteristics of the film and/or the precursor thereof and the desired electrochemical characteristics of the anode, which may allow for each of the component concentration to vary between about 0% and about 99% by weight of the film precursor.

In some embodiments, the film precursor may be a paste. For example, a film precursor may be the paste described above that is produced during at least some embodiments of the synthesis of Li—SiNC, Li—SiGeNC, and/or Li—GeNC. In another example, a paste film precursor may be a paste of SiGeNC, graphite, and polyvinylidene fluoride in N-methyl-2-pyrrolidone. In some embodiments, the anode may comprise a fast ion conductor layer (e.g., lithium nitride or the like) between the conductive support and the film.

In some embodiments, the film precursor may be a less viscous liquid, which may be a diluted paste or formed independently. In some embodiments, lower viscosities may be achieved with the use of organic solvents (e.g., benzene, methanol, and the like). In some embodiments, the film precursor may be at a viscosity that enables deposition onto the conductive substrate by methods like electrodeposition, spraying, painting, dip coating, calendaring, and the like. Such methods may advantageously enable scaling the production of anodes described herein to industrial production levels, e.g., using coating methods similar to that used in the semiconductor industry or using printing methods in producing flexible batteries or similar devices.

In some embodiments, after deposition onto a conductive substrate, the film precursor may be dried to yield the film that comprises the pre-lithiated nanocrystals described herein (e.g., between about 30° C. and about 220° C. depending on the composition of the film precursor). In some embodiments, after deposition onto the conductive substrate, the film precursor may be allowed to set to yield a hydrogel or organogel film that comprises the pre-lithiated nanocrystals described herein.

The diffusion limit of lithium into a SiNC, SiGeNC, or GeNC deposition coating is typically between 30-40 microns. Therefore, in some embodiments, the thickness of the film comprising the nanoparticles described herein may have a thickness ranging from a lower limit of about 10 microns, 25 microns, or 100 microns to an upper limit of about 500 microns, 250 microns, or 100 microns. The thickness may range from any lower limit to any upper limit and encompasses any subset therebetween.

Figure 9:
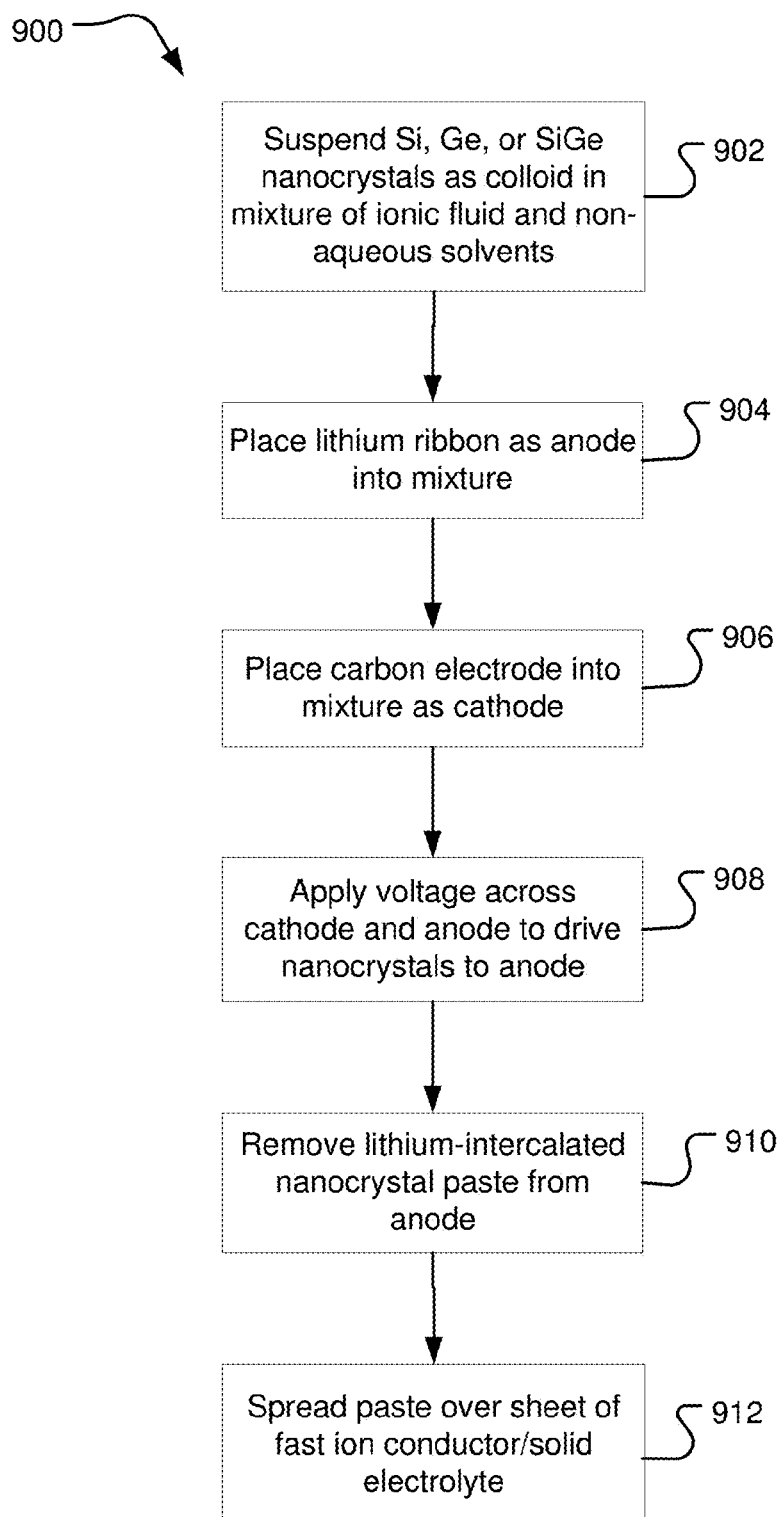
FIG. 9 is a flow diagram of a process for manufacturing a high energy capacity anode for lithium ion batteries via electrochemical super saturation of lithium into silicon, germanium, and/or silicon-germanium alloy nanoparticles.

FIG. 9 is a flowchart depicting a general electrodeposition process 900 for preparing a pre-lithiated nanocrystal paste for use in anode construction. In step 902, SiNCs, SiGeNCs, and/or GeNCs are mixed into a solution of an ionic fluid(s), a nonaqueous solvent(s), or a combination of both to form a colloidal suspension of the nanocrystals. A lithium metal ribbon is positioned in the colloidal mixture as an anode electrode as indicated in step 904. Similarly, a carbon electrode is placed into the colloidal mixture as a cathode as provided in step 906. A voltage is then applied across the anode and cathode to drive the nanocrystals from the mixture to coalesce on the lithium metal ribbon anode as indicated in step 908. Lithium ions from the lithium metal intercalate into the nanocrystals deposited on the lithium metal and the lithiated nanocrystals in the presence of the ionic fluid and/or solvent form a paste on the surface of the lithium metal ribbon. The lithium-diffused nanocrystal paste is then removed from the lithium metal anode as indicate in step 910. Finally, a prelithiated anode is formed by spreading or otherwise distributing the paste over an electrode, such as a fast ion conductor or a solid electrolyte, as indicated in step 912.

Figure 10:
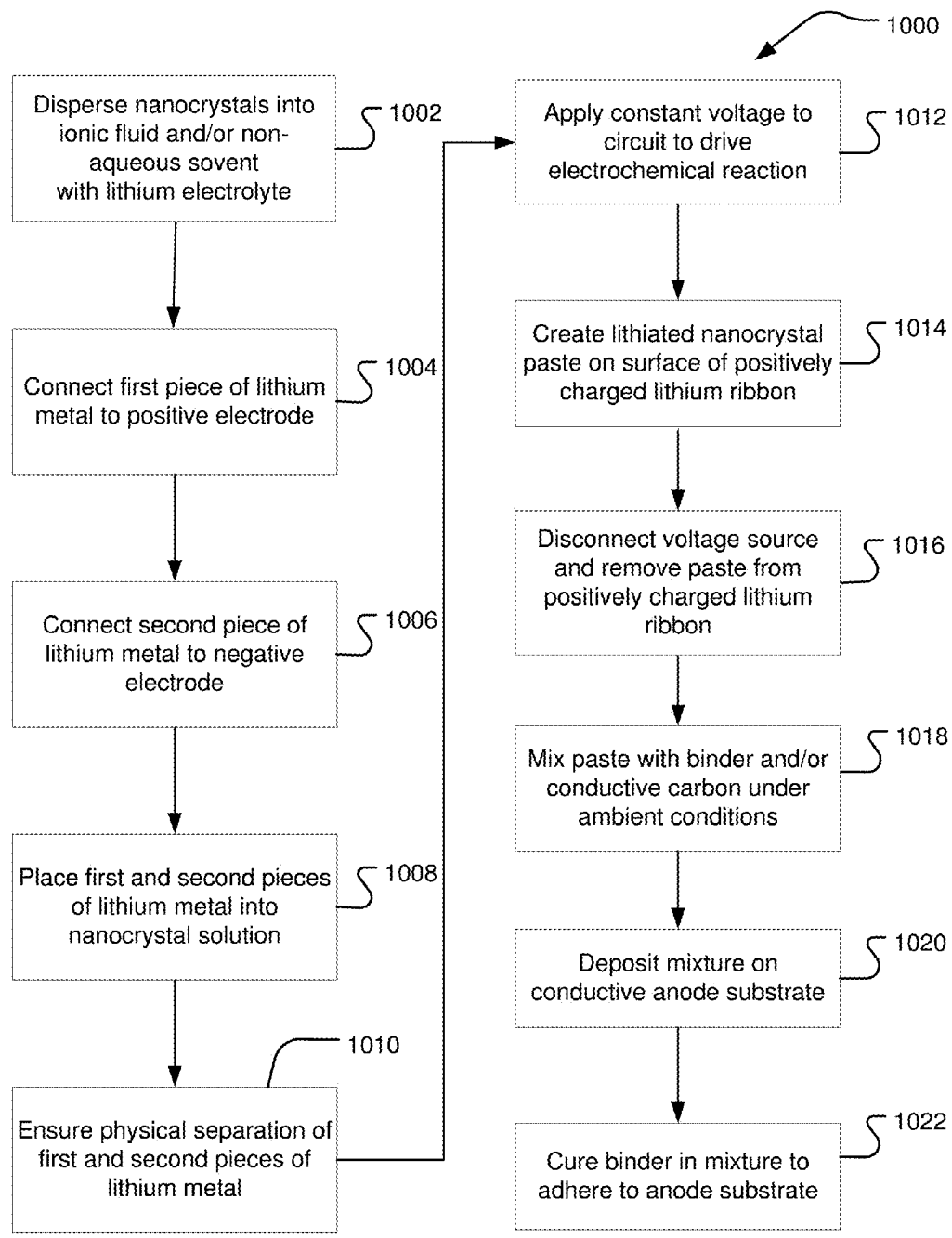
FIG. 10 is a flow diagram of a process for manufacturing a high energy capacity anode for lithium ion batteries via electrolytic super saturation of lithium into silicon, germanium, and/or silicon-germanium alloy nanoparticles.

FIG. 10 is a flowchart depicting a general electrolytic process 1000 for preparing a pre-lithiated nanocrystal paste for use in anode construction. In step 1002, SiNCs, SiGeNCs, and/or GeNCs are mixed into a solution of an ionic fluid(s), a nonaqueous solvent(s), or a combination of both, plus a lithium electrolyte, to form a colloidal suspension of the nanocrystals. A first piece of lithium metal ribbon is connected to a positive electrode as provided in step 1004 and a second piece of lithium metal ribbon is connected to a negative electrode as provided in step 1006. Each of the first and second pieces of lithium metal is positioned in the colloidal mixture as indicated in step 1008 with care taken to ensure physical separation of the lithium metal electrodes as noted in step 1010. A voltage is then applied across the electrodes to drive the nanocrystals from the mixture to coalesce on the lithium metal ribbon anode as indicated in step 1012. The voltage is maintained until lithium ions from the lithium metal ribbon intercalate into the deposited nanocrystals and a paste of lithiated nanocrystals and solvent forms on the surface of the lithium metal ribbon as provided in step 1014. The voltage source is then disconnected from the electrodes and the lithium-diffused nanocrystal paste is removed from the lithium metal ribbon as indicated in step 1016. The paste is then mixed with binder and/or conductive carbon under ambient conditions, i.e., in air at atmospheric pressure without additional safeguards such as an inert gas or low moisture environment, as indicated in step 1018. The paste and binder mixture is then spread or otherwise distributed on a conductive anode substrate as provided in step 1020. Finally, the binder is cured in order to adhere the lithiated nanocrystal paste to the anode substrate to complete formation of a prelithiated anode as indicated in step 1022.

Example 1: Anode Construction Via Electrodeposition

In accordance with the general method shown in FIG. 9 and described above, a high-energy capacity anode for lithium ion batteries may be formed via electrochemical super saturation of lithium into silicon, germanium, and silicon-germanium alloy nanoparticles. Silicon, germanium, and/or silicon-germanium alloy nanoparticles (Universal Nanotech Corporation), were suspended as a colloid in a mixture of an ionic fluid 1-butyl-3-methylimidazolium thiocyanate (bmimSCN) and a non-aqueous solvent dimethylacetamide. A ⅔" strip of Li metal ribbon was used as an anode and carbon electrode was used as a cathode. Each was connected to a respective terminal of a voltage source and placed in the colloidal mixture. Voltage in a range of 250 mV-5 V, typically 2-4V, was applied to drive a current through the solution to begin the Li intercalation into the nanocrystals.

The nanocrystals are driven to the Li metal anode. Visually, the lithium ribbon appears to "swell" and take on a reddish-orange-maroon color. This "swelling" is a coating of the lithiated nanocrystals on the decomposed lithium ribbon. The final consistency of the resulting product is a paste or gel-like consistency with lubricity provided by the ionic fluid/solvent mixture. An anode was formed by spreading the gel with a spatula over a sheet comprised of a fast ion conductor (e.g., solid electrolyte, such as lithium nitride. The nanocrystal anode paste on the fast ion conductor structure was then sandwiched on top of a cathode material ($LiMn_2O_4$). An aluminum electrode was attached to the cathode (i.e., $LiMn_2O_4$) and a copper electrode was attached to the anode to form a battery. The entire structure was sealed in a protective nonconductive lamination sheet with portions of the aluminum and copper electrodes protruding outside the lamination sheet to serve as terminals for the battery.

Example 2: SiGeNC Lithiation Using Ionic Fluid bmimSCN

In an argon filled environment (i.e., a glove box), two separate pieces of lithium metal foil (each 2 cm L×1 cm W×0.038 cm t) were connected, respectively, to the negative and positive electrodes of a power supply. $Si0.22Ge0.78NCs$ were dispersed into 1-butyl-3-methylimidazolium thiocyanate (bmimSCN) and heated to 40° C. under argon with constant stirring in an Erlenmeyer flask. The concentration of $Si0.22Ge0.78NCs$ in the ionic fluid was matched to the lithium (1 cm L×1 cm W×0.038 cm t) such that nearly all the lithium was absorbed by the amount of GeNCs contained in the flask. For this experiment, 0.00288 mol Li (1 $cm^2$) and 0.0160 mol of $Si0.22Ge0.78NCs$ were used. The electrodes were placed directly opposed to each other 1 cm apart with 1 $cm^2$ of the Li metal submerged into the $Si0.22Ge0.78NCs$-ionic fluid dispersion. A constant voltage 3V was used to drive the $Si0.22Ge0.78NCs$ to the lithium metal on the positive electrode where the lithium subsequently diffused into the $Si0.22Ge0.78NCs$. The reaction was stopped after 25 minutes. The resultant product was a deep red paste comprised of the ionic fluid and lithiated $Si0.22Ge0.78NCs$.

Example 3: Anode Construction Using Electrolyte LiTFSI

The process of Example 2 was altered to introduce an electrolyte, lithium bis(trifluoromethanesulfonyl)imide (LiTFSI) to make a 1M solution of LiTFSI in bmimSCN. The general method was thus changed to follow the process shown in FIG. 10 and described above. Additionally, the process was conducted at room temperature. In all other respects the conditions were the same. The addition of the lithium salt (LiTFSI) reduced the reaction time to create the paste from 25 minutes to 15 minutes.

Example 4: Anode Construction Using Electrolyte $LiPF_6$

In accordance with the general method shown in FIG. 10 and described above, in an argon filled environment (e.g., in a glove box) at room temperature and atmospheric pressure, two separate pieces of lithium metal foil (each 2 cm L×1 cm W×0.038 cm t) were connected, respectively, to the negative and positive electrodes of a power supply. High quality (spherically symmetric) germanium nanocrystals (<150 nm diameter) were dispersed into an electrolyte of lithium salt, i.e., lithium hexafluorophosphate (LiPF$_6$) in a 1:1 ratio of ethylene carbonate to diethyl carbonate in an Erlenmeyer flask. The electrodes were placed directly opposed to each other 1 cm apart with 1 cm$^2$ of the Li metal submerged into the GeNC-electrolyte dispersion. For this experiment, 0.00288 mol LiPF$_6$ and 0.0127 mol of GeNCs were used. The concentration of germanium nanocrystals in the electrolyte was matched to the lithium (1 cm L×1 cm W×0.038 cm t) such that nearly all the lithium is absorbed by the amount of germanium contained in the flask. A constant voltage 4V was used to drive the germanium nanocrystals to the lithium metal on the positive electrode where the lithium diffused into the GeNCs deposited onto the lithium foil. The reaction was stopped after 15 minutes. The resultant product was a viscous dark purple-black paste comprised of electrolyte and lithiated GeNCs. The paste can then be mixed with a binder or conductive carbon additive and be deposited onto a conductive substrate for use as a lithium-ion battery anode.

Example 5: Anode Construction Using bmimSCN with Electrolyte LiPF$_6$

Figure 11:
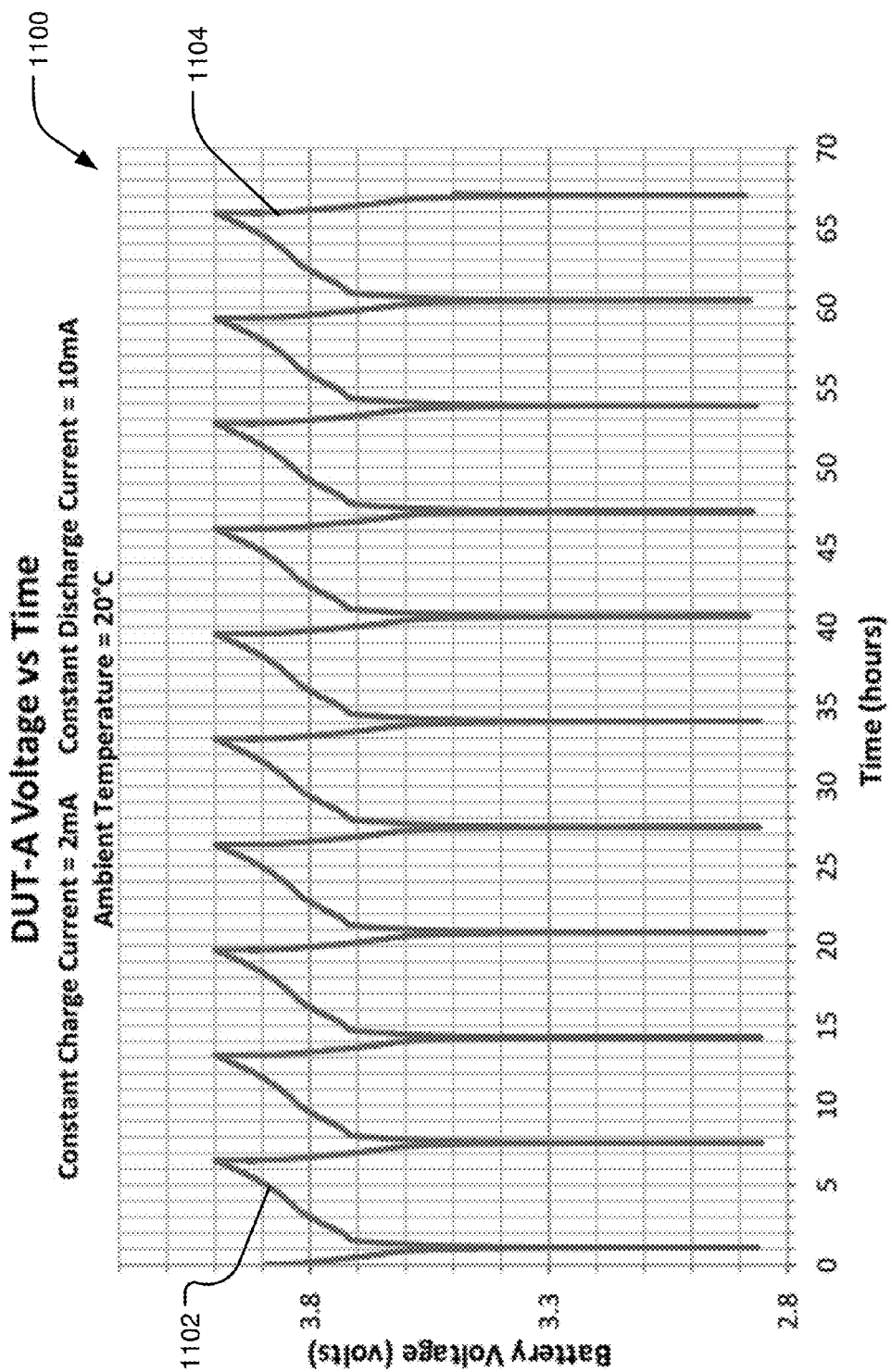
FIG. 11 is a graphic plot of sequential charge/discharge cycles of battery having a prelithiated germanium nanocrystal anode in units of voltage vs. time.

The process of Example 4 was altered to use 1-butyl-3-methylimidazolium thiocyanate (bmimSCN) as the ionic fluid in conjunction with lithium hexaflurophosphate LiPF6). In other respects the apparatus, conditions, and techniques of Example 4 remained the same with the exception of a lower voltage of between 2V-4V held constant while the electrochemical reaction occurred. A dark brown to purple black paste comprised of electrolyte and lithium loaded GeNCs formed on the lithium electrode. An anode was formed with the paste and it was combined with a cathode electrode in a manner similar to Example 1 to form a cell. FIG. 11 depicts a series of discharge/recharge cycles 1100 for this exemplary cell. The cell was tested for energy capacity and volumetric energy density according to standard Li-ion battery testing protocol. Each charge cycle 1102 had a charge rate of C/10 and a discharge rate of 1 C. The cell had a 98% Coulomb efficiency, i.e., each discharge cycle 1104 was consistently 98% of energy that was put in for the charge.

Example 6: Half-cell Anode Constructed from Lithiated Nanocrystal Material

Germanium nanocrystals were mixed into a slurry with poly acrylic acid binder (PAA)-450, Super-P Li conductive additive (Timcal), and N-Methyl-pyrollidone. The ratio of Li—GeNC to conductive carbon to binder was 40:40:20. The mixture was bath sonicated for 15 minutes and then spread with a doctor blade onto a copper foil current collector. The slurry coated copper electrode was then placed in an oven at 60° C. to evaporate the solvent (N-Methyl-2-pyrollidone). After drying, the coated copper electrode was calendered (roll pressed) to achieve a film thickness of 10 μm. Discs with a diameter of 11 mm were punched out of the paste coated copper electrode for half-cell assembly. The resulting mass loading was measured to be 2.98 mg/cm2 of Li—GeNC.

Figure 12:
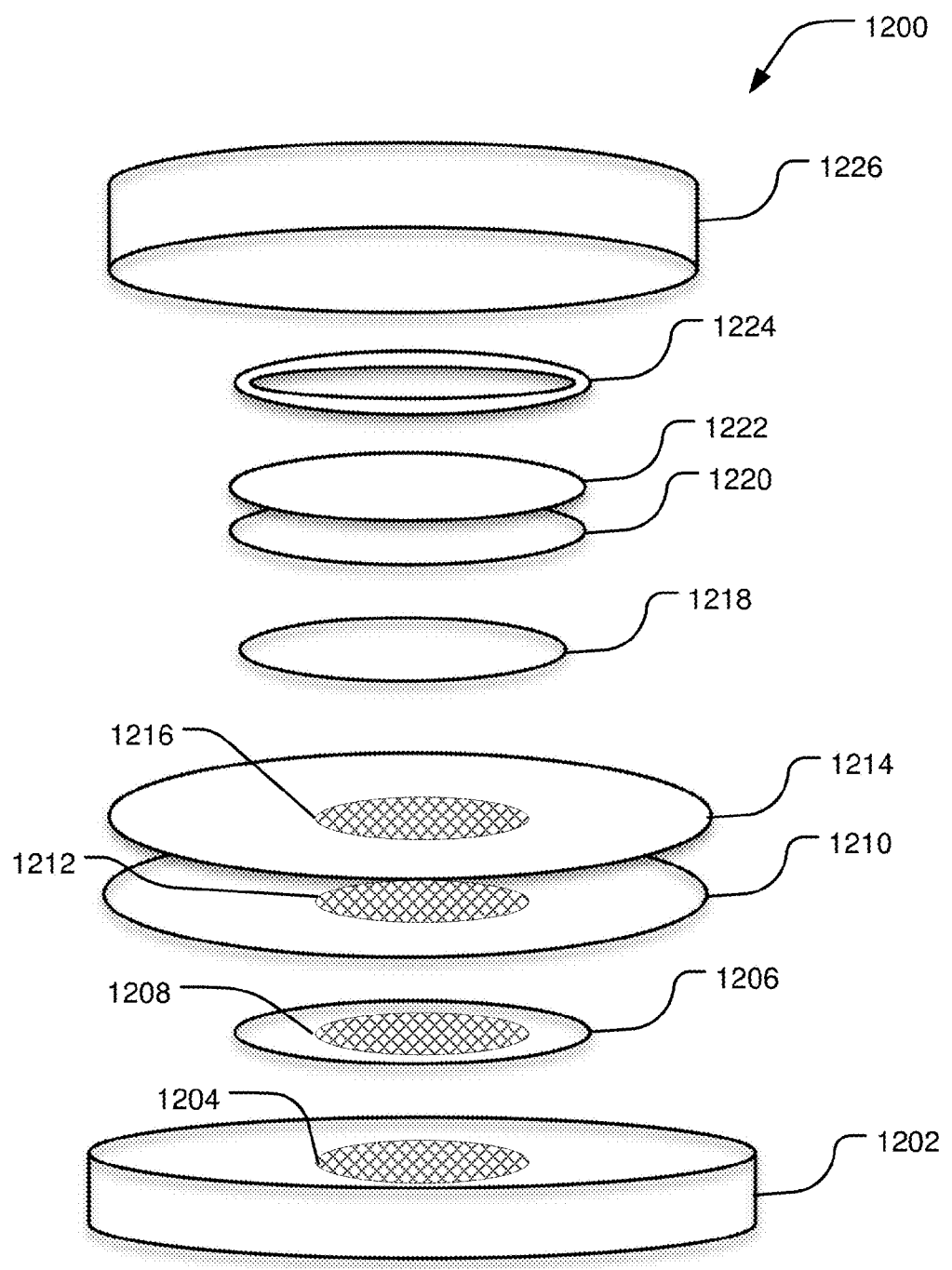
FIG. 12 is a schematic diagram in an exploded view of a half-cell incorporating a high energy capacity lithium-intercalated germanium nanocrystal anode.
Figure 13:
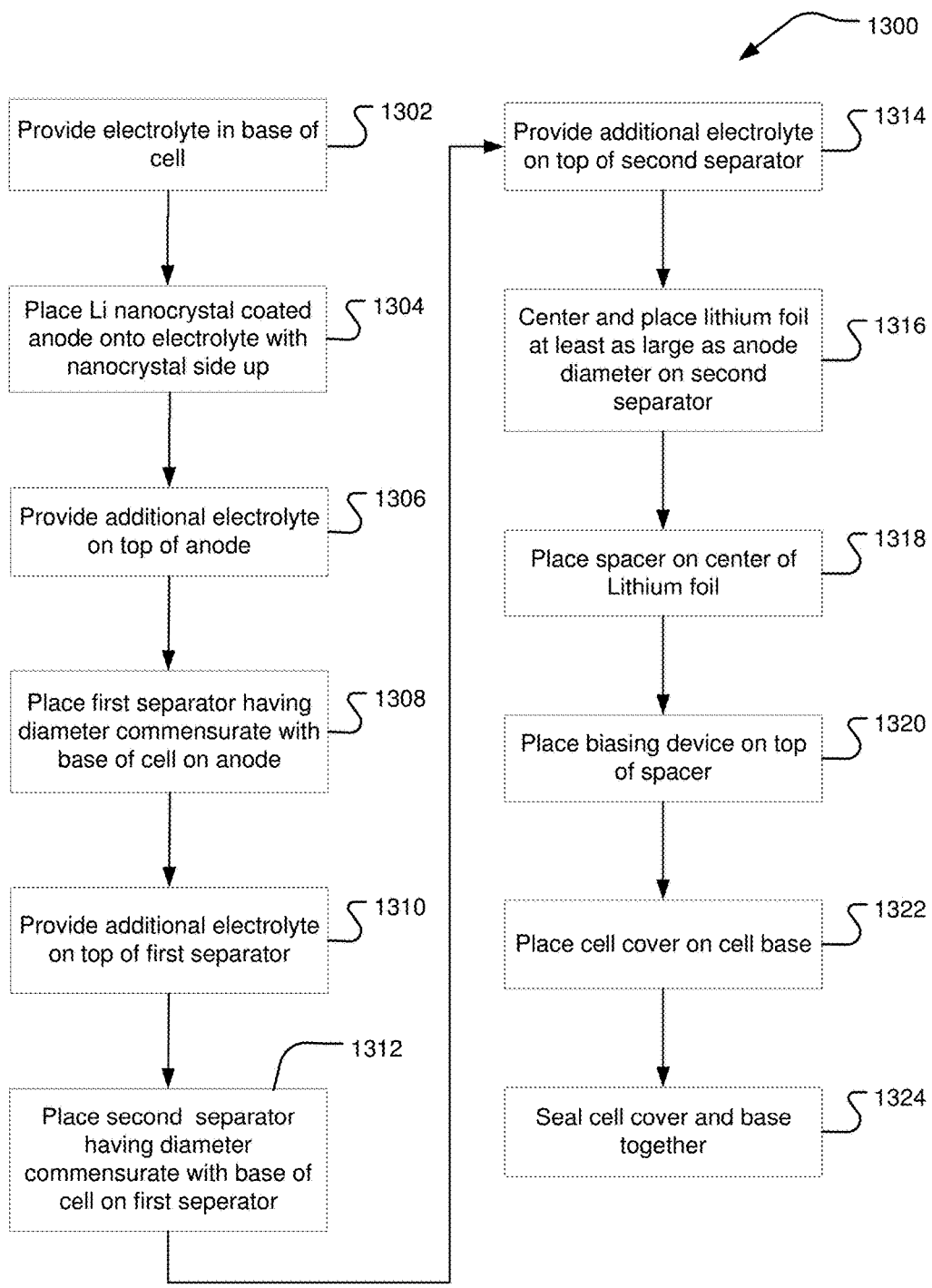
FIG. 13 is a flow diagram of a process for manufacturing a half-cell incorporating a high energy capacity lithium-intercalated germanium nanocrystal anode.

The half-cell was assembled in an argon filled glove box using a 2032 stainless steel coin cell with a negative base and positive cap. A schematic diagram of the components of the half-cell anode 1200 in an exploded view is depicted in FIG. 12 and a method 1300 for assembling the half-cell is presented in FIG. 13. Initially, 25 μL of electrolyte 1204 is deposited at the center of the cell case base 1202 as indicated in step 1302. In this example, the electrolyte is 1M LiPF6 in fluoroethylene carbonate (FEC) (both from Aldrich) (<0.1 ppm O2). Next, the Cu/Li—GeNC anode 1206 is placed onto the electrolyte droplet 1204 in the center of the base 1202 with the anode Li—GeNC paste-coated side up and Cu side down as indicated in step 1304. Another 25 μL of electrolyte 1208 is then added to the center of the anode 1206 as indicated in step 1306. A 19 mm diameter polypropylene separator 1210 (e.g., Celgard 2500 membrane separator at 25 μm thickness), sized to cover the entire cell base 1202, was placed onto the anode 1206 as indicated in step 1308. Another 25 μL of electrolyte 1212 was then deposited on the center of the separator 1210 as indicated in step 1310. A second polypropylene separator 1214 (also commensurate in size with the cell base 1202) was placed onto the first separator 1210 over the electrolyte 1212 as indicated in step 1312. A further 25 μL of electrolyte 1216 was then added to the center of the second separator 1314.

A lithium foil disk 1218 of at least the same diameter as the anode 1206 was placed onto the center of the second separator 1214 to act as a counter/reference electrode as indicated in step 1316. A stack of two stainless steel spacers 1220, 1222 centered on the cell base 1202 were placed onto the lithium foil disk 1218 as indicated in step 1318. A biasing device such as a spring washer 1224 was placed onto the spacer stack 1220, 1222 as indicated in step 1320. The cell cap 1226 is then placed over the spring washer 1224 as indicated in step 1322 and the cell cap 1226 and cell base 1202 are compressed together to encase the other components of the cell stack as indicated in step 1324. (Any excess electrolyte forced out when cell is compressed may be wiped off.) The cell cap 1226 and cell base 1202 may then be sealed together as indicated in step 1326, for example, by placing the half-cell 1200 in a crimping tool with the cell base 1202 oriented downward and crimping and removing any excess fluid after crimping. The half-cell anode 1200 may be used to make a full coin cell as described in further detail below with respect to FIGS. 15 and 16.

Figure 14:
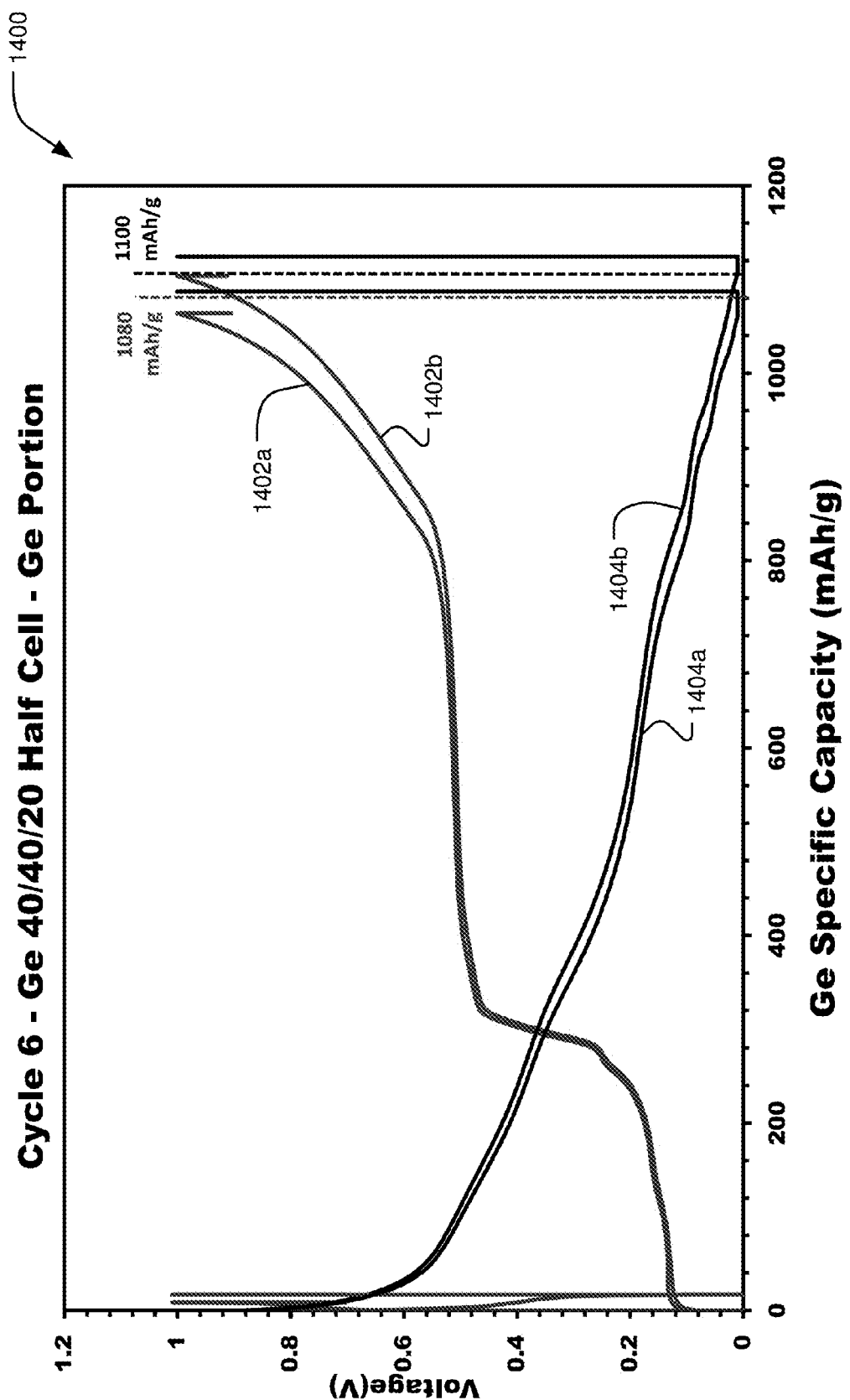
FIG. 14 is a graphic plot of sequential charge/discharge cycles of a prelithiated germanium nanocrystal anode half-cell.

Once the half-cell 1200 was completed, an initial conditioning cycle of C/20 using 1 C=1180 mAh/g and constant current for charge-discharge was run between 0.01 V and 1V vs. Li/Li+. Subsequent cycles were carried out at a rate of 1 C. FIG. 14 shows a graph 1400 of two sequential charge cycles 1402a/b and related discharge cycles 1404a/b for the GeNC anode half-cell 1200 of Example 6. Each of the charge cycles 1402a/b reaches a specific energy capacity of about 1080 mAh/g from an original capacity of 1100 mAh/g after multiple recharge cycles, thus indicating no breakdown in the charge capacity of the anode as the nanocrystals expand and contract with lithiation and dilithiation.

Example 7: Anode Cycle Testing

A plurality of samples were prepared by electrodepositing GeNC on to glass coated with indium tin oxide. Using an Agilent Technologies 4155C Semiconductor Parameter Analyzer and two Alessi needle probes in contact with the sample, I-V curves were obtained, and V$_{OC}$ values of about 7 to about 14 were measured. Further, the charge-discharge rates observed were comparable to other technologies like bulk silicon or germanium.

Batteries and Similar Devices Comprising the Disclosed Cathodes and Anodes

In some embodiments, batteries and similar devices described herein may comprise an anode described herein that comprises the nanocrystals described herein; a cathode; a separator disposed between the cathode and the anode; and an electrolyte. One skilled in the art with the benefit of this disclosure should understand the plurality of configurations for such components to achieve a desired the battery and similar device. Examples of similar devices may include, but are not limited to, super-capacitors, ultra-capacitors, capacitors, dual in-line package batteries, flex batteries, large-format batteries, and the like.

Examples of cathode materials may, in some embodiments, include, but are not limited to, lithium cobalt oxide, lithium nickel oxide, lithium manganese oxide, lithium iron phosphate, lithium cobalt nickel manganese oxide, polypyrrole, polyaniline, and the like, and any combination thereof.

Examples of separators may, in some embodiments, include, but are not limited to, polyolefin-based separators, fluorinated polyolefin-based separators, fluorine resin based separators (e.g., polyethylene separators), polypropylene separators, polyvinylidene fluoride separators, VDF-HFP copolymer separators, polyethylene/polypropylene bilayer separators, polypropylene/polyethylene/polypropylene triple layer separators, polyethylene/polypropylene/polyethylene triple layer separators, and the like, any hybrid thereof, and any combination thereof.

In some embodiments, the electrolyte of the half-cells, batteries, and similar devices described herein may be a traditional electrolyte, e.g., a lithium salt in a non-aqueous solvent optionally with a polymer or a solid electrolyte. Examples of lithium salts may include, but are not limited to, fluorine-containing inorganic lithium salts (e.g., lithium bis(trifluoromethanesulfonyl)imide (LiTFSI), $LiPF_6$, and $LiBF_4$), chlorine-containing inorganic lithium salts (e.g., $LiClO_4$), fluorine-containing organic lithium salts (e.g., $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_4(C_2F_6)_2$, $LiPF_4(CF_4SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$), and the like, and any combination thereof. Examples of non-aqueous solvents may, in some embodiments, include, but are not limited to, 1-butyl-3-methylimidazolium thiocyanate (bmimSCN), N-butyl-N-methylpyrrolidinium bis(trifluoromethanesulfonyl)imide (Pyr14TFSI), cyclic carbonates (e.g., ethylene carbonate and propylene carbonate), linear carbonates (e.g., dimethyl carbonate and ethylmethyl carbonate), cyclic carboxylic acid esters (e.g., γ-butyrolactone and γ-valerolactone), and the like, and any combination thereof. Examples of solid electrolytes may include, but are not limited to, polyethylene oxide (PEO), polyacrylnitrile (PAN), or polymethylmethacrylate (PMMA), and the like, and any combination thereof. Examples of solid electrolytes (also known as fast ion conductors) may, in some embodiments, include, but are not limited to, lithium nitride, lithium iodide, lithium phosphate, and the like, and any combination thereof.

In some embodiments, the use of the nanocrystals described herein may enable the production of batteries and similar devices that can be cycled (i.e., charged and discharged) a plurality of times (e.g., about 500 times or greater) with minimal power density loss.

In some embodiments, the use of the nanocrystals described herein may enable the production of batteries and similar devices that have a tailorable open circuit voltage ($V_{OC}$), which may range from about 0.1 V to about 18 V including any subset therebetween. The $V_{OC}$ of the device may depend on, inter alia, the morphology and composition of the nanocrystals. Advantageously the $V_{OC}$ values that can be achieved be advantageous in producing higher voltage devices as bulk silicon and germanium have $V_{OC}$ levels on the order of about 0.4 V to about 1.1 V.

Example 8: Battery Cell with Li—GeNC Anode

A battery prototype was produced using an anode comprising Li—GeNCs. The anode measured an energy density per area of about 7.67 mWh/cm$^2$ and a capacity per area of about 2.32 mAh/cm$^2$, which were used to derive the anode energy density of about 38,350 Wh/L, an anode specific energy of 13,456 Wh/kg, and an anode specific capacity of about 3,684 Ah/kg. Further, upon several charge-discharge cycles (greater than 20), the battery showed no measurable degradation in performance. Such a battery has been charged and retained the charge for two to three weeks with no measurable loss of charge.

Example 9: Battery Cell with Li—SiGeNC Anode

Another battery prototype was produced using an anode comprising lithium stored in SiGeNCs. The anode measured an energy density per area of about 3 mAh/cm$^2$. Further, upon several charge-discharge cycles (greater than 20), the battery showed no measurable degradation in performance. Such a battery has been charged and retained the charge for two to three weeks with no measurable loss of charge.

Figure 15:
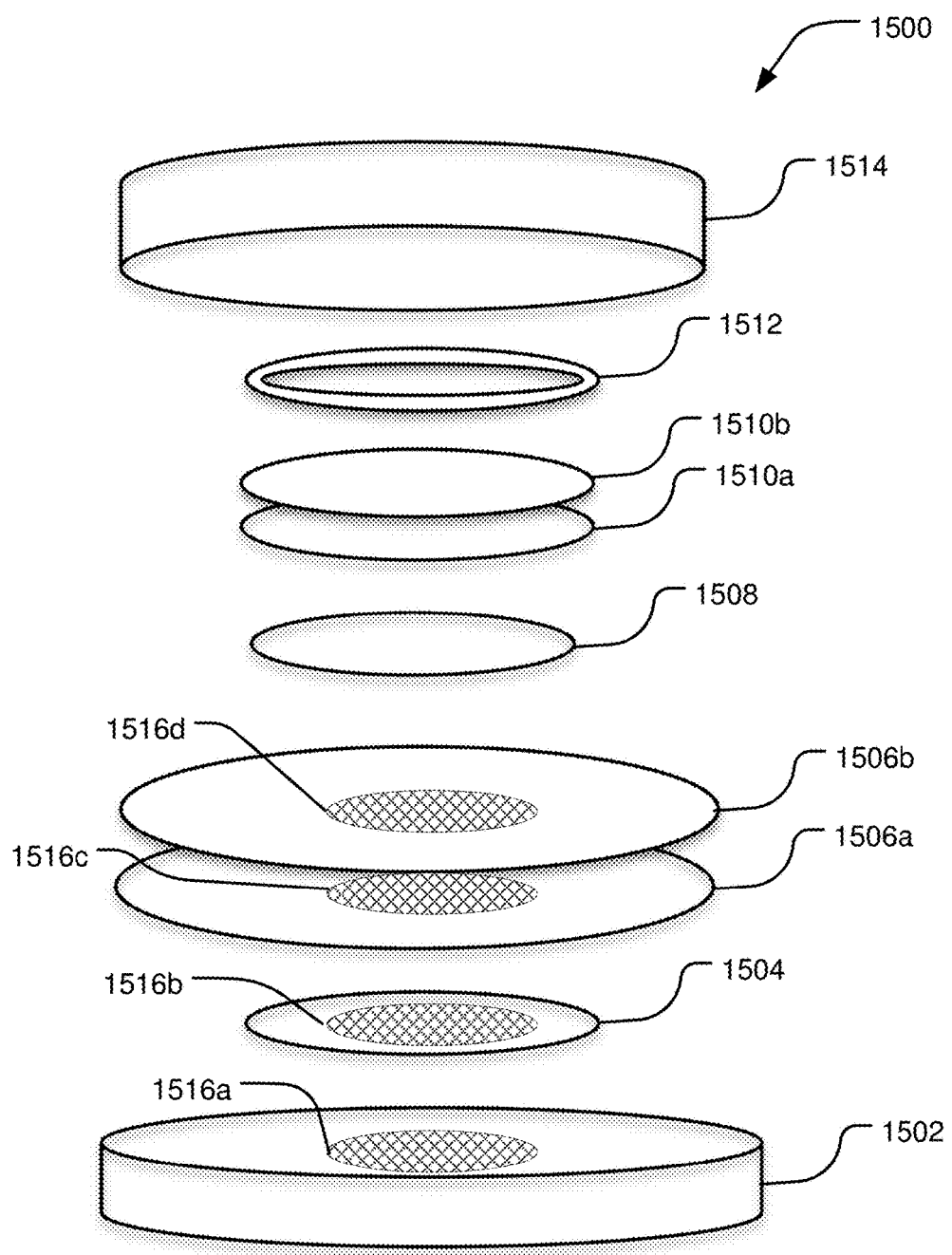
FIG. 15 is a schematic diagram of a battery cell incorporating a sulfur charged carbon nanotube cathode and a high energy capacity lithium-intercalated germanium nanocrystal anode.
Figure 16:
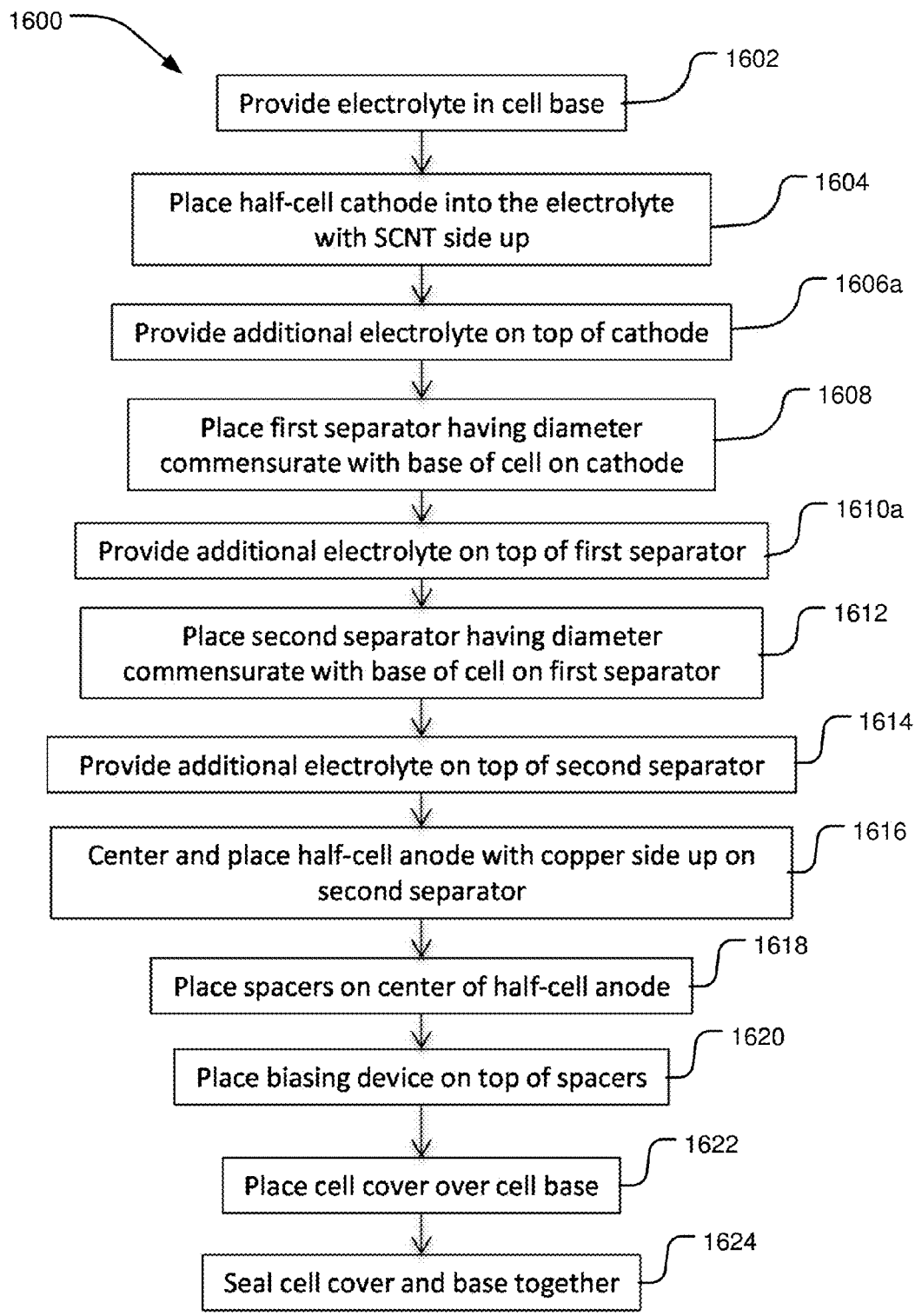
FIG. 16 is a flow diagram of a process for manufacturing a battery cell incorporating a sulfur charged carbon nanotube cathode and a high energy capacity lithium-intercalated germanium nanocrystal anode.

Example 10: Full Coin Cell Battery with Li—SiGeNC Anode and S—C Nanotube Cathode FIG. 15 is a schematic view of full coin cell, generally designated 1500. FIG. 16 is a method, generally designated 1600 for assembling a full coin cell in accordance with the embodiment of FIG. 15. The full coin cell may include a cell base 1502, a half-cell cathode 1504, one or more separators 1506a/b, a half-cell anode 1508, one or more spacers 1510a/b, a biasing device 1512, and a cell cover 1514.

In step 1602, an electrolyte 1516a is provided to the cell base 1502. The electrolyte 1516a may be, for example, 0.25 $E^{-3}$ mol g$^{-1}$ of $LiNO_3$ ($LiNO_3$=68.95 g mol$^{-1}$), 0.25 $E^3$ mol g$^{-1}$ of DEMMOX (DEMMOX=466.4 g mol$^{-1}$), and a 1:1 (wt.) mixture of DME and DOL. In one embodiment, 25 μL of the electrolyte 1516a is provided to the center of the cell base 1502. In step 1604, the half-cell cathode 1504 is placed into the electrolyte 1516a. In various embodiments, the half-cell cathode 1504 includes a sulfur charged carbon nanotube cathode as described above with respect to FIGS. 1-6. In various embodiments, the cathode 1504 is placed with the aluminum contact of the cathode 1504 toward the cell base 1502 and the sulfur charged carbon nanotube coated side away from the cell base 1502. In step 1606, additional electrolyte 1516b is provided on top of the half-cell cathode 1504. In one embodiment 25 μL of the electrolyte 1516b is provided on top of the half-cell cathode 1504.

In step 1608, a first separator 1506a is placed on top of the electrolyte solution and the cathode 1504. In various embodiments, the first separator 1506a may have a diameter commensurate with the diameter of the cathode 1504. In certain embodiments, the first separator 1506a may be a 19 mm polypropylene separator. In step 1610, additional electrolyte 1516*c* is provided on top of the first separator 1506*a*. In one embodiment 25 µL of the electrolyte 1516*c* is provided on top of the first separator 1506*a*. In step 1612, a second separator 1506*b* is placed on top of the electrolyte solution 1516*c* and the first separator 1506*a*. In various embodiments, the second separator 1506*b* may have a diameter commensurate with the diameter of the first separator 1506*a*. In certain embodiments, the second separator 1506*b* may be a 19 mm polypropylene separator. In step 1614, additional electrolyte 1516*d* is provided on top of the second separator 1506*b*. In one embodiment 25 µL of the electrolyte 1516*d* is provided on top of the second separator 1506*b*.

In step 1616, a half-cell anode 1508, that is at least as large as the cathode diameter, is centered and placed on the electrolyte 1516*d* on the second separator 1506*b*. In various embodiments, the half-cell anode 1508 may completely cover the cathode 1504. In certain embodiments, the half-cell anode 1508 may be produced as described above with respect to FIGS. 12 and 13. In step 1618, the one or more spacers 1510*a/b* are placed on top of the half-cell anode 1508. In various embodiments, the spacers 1510*a/b* may be stainless steel spacers. In various embodiments, two spacers 1510*a/b* are placed on the half-cell anode 1508. In step 1620, the biasing device 1512 is placed on top of the spacers 1510*a/b*. In various embodiments, the biasing device 1512 may be a spring washer. In other embodiments, the biasing device 1512 may be any other type of biasing device that does not interfere with the electrical properties of the full coin cell 1500. In step 1622, the cell cover 1514 is placed over the cell base 1502 to enclose the contents of the full coin cell 1500. In various embodiments, enclosing the full coin cell 1500 may cause electrolyte to leak from the full coin cell 1500. Any electrolyte may be removed from the outside of the full coin cell 1500. In step 1624, the cell cover 1514 and the cell base 1502 are sealed together to create a complete full coin cell 1500.

Production of High Quality and Strained Nanocrystals

The methods and systems of the present disclosure may advantageously enable the high-yield production of nanoparticles (e.g., 85% or greater yield in some embodiments), and especially nanocrystals and metal nanoparticles, with narrow size distributions (e.g., ± about 2 nm in some embodiments). Further, the methods and systems described herein are capable of being adapted to relatively high-production rates (e.g., kilograms per hour) and continuous methods, which may enable industrial-scale production of highly uniform nanoparticles, including nanocrystals and metal nanoparticles. As used herein, the term "nanoparticle" is interchangeable with the term "nanocrystal" and should be understood as such for those elements that form crystalline structures.

In addition, the methods and systems described herein have been unexpectedly found to, in some embodiments, yield unique nanoparticle compositions, which may be useful in a plurality of applications including ion batteries and quantum energy devices.

Various embodiments described herein may involve producing nanoparticles by heating an aerosolized precursor solution, which in some embodiments may be adapted for continuous and high-production rate nanoparticle production.

Some embodiments may involve aerosolizing a precursor solution in the presence of a flowing carrier gas, thereby yielding a reactant stream; heating the reactant stream to form a product stream that comprises a plurality of nanoparticles; cooling the product stream; and passing the product stream through a liquid to collect the nanoparticles from the product stream. In some embodiments, the precursor solution may comprise a volatile solvent and nanoparticle precursors; and the reactant stream may be heated to a temperature above the boiling point of the volatile solvent. As used herein, the term "nanoparticle" refers to particles having at least one dimension less than about 40 µm and encompasses amorphous nanoparticles, nanocrystals, core-shell nanoparticles, non-spherical nanoparticles (e.g., oblong or rod-like particles), substantially spherical nanoparticles, hollow spherical nanoparticles, and the like.

Aerosolizing the precursor solution forms droplets that, when heated above the boiling point of the volatile solvent, may cause the volatile solvent to evaporate from the droplet and the nanoparticle precursors droplets to coalesce and react, thereby yielding nanoparticles, and in some instances nanocrystals. It should be noted that depending on the conditions of synthesis (e.g., aerosolizing parameters, reaction temperatures, volatile solvent composition, and nanoparticle precursor compositions and/or concentrations) nanoparticles may be formed by a one droplet-one nanoparticle mechanism, a ripening mechanism, a disintegration mechanism, or a combination thereof. In various embodiments, the one droplet-one nanoparticle mechanism may produce monodispersed particles (i.e., single size particles). In other embodiments, the disintegration mechanism may produce bimodal, trimodal, or other multi-modal nanoparticle size distributions. Such multimodal distributions of nanoparticles may enable higher packing efficiency when deposited in a layer on a substrate.

Figure 17:
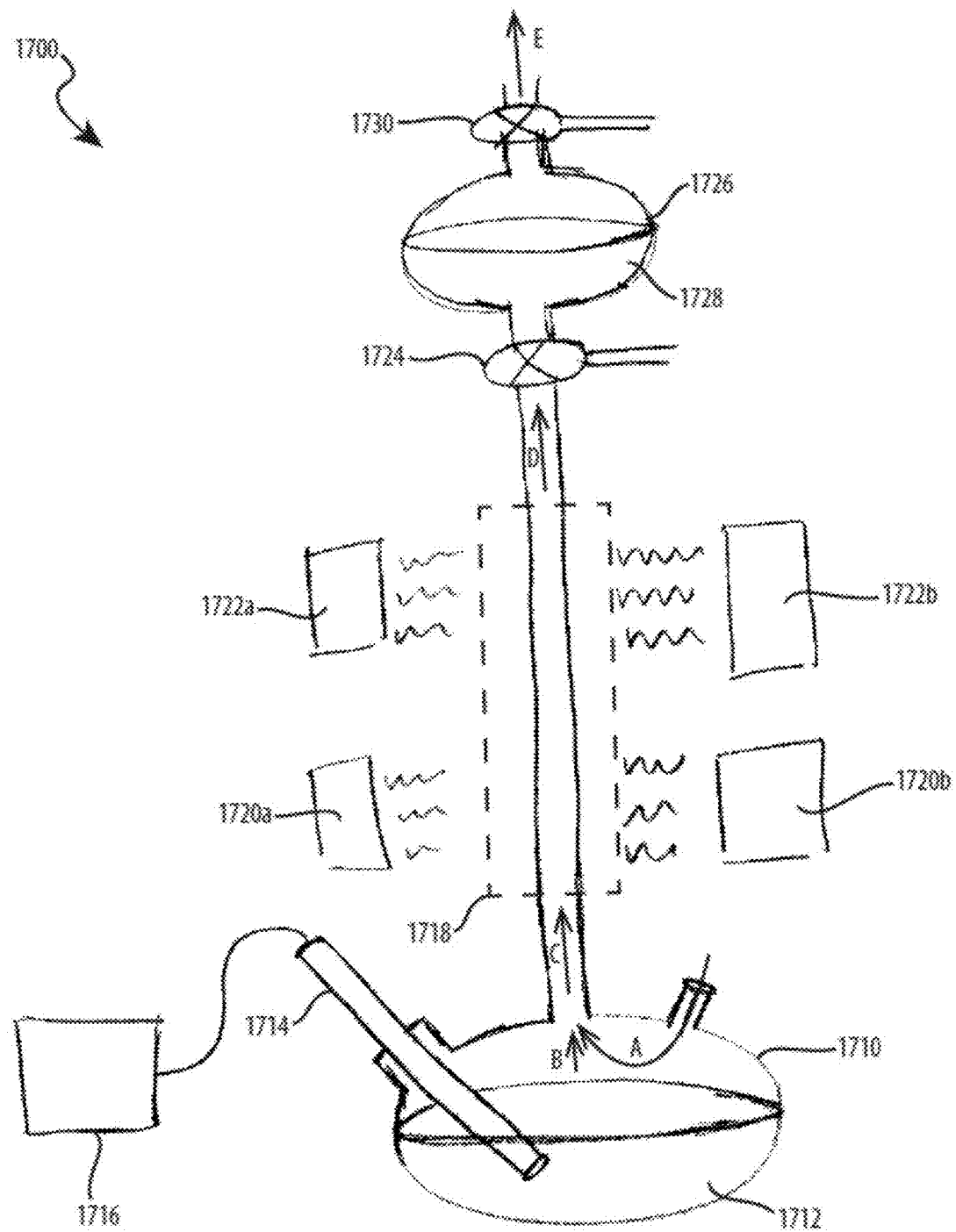
FIG. 17 is a schematic diagram of a system for producing nanoparticles.

Referring now to FIG. 17, a system for producing nanoparticles, generally designated 1700, is shown. The system 1700 may include a precursor solution vessel 1710 that contains a precursor solution 1712, which has submersed therein a sonicator 1714 for producing an aerosol B. The sonicator 1714 may be attached to a control box 1716 that enables manipulation of the frequency, amplitude, and waveform produced by the sonicator 1714. Further, the precursor solution vessel 1710 has a carrier gas A passing though it, which mixes with the aerosol B to yield a reactant stream C. The reactant stream C may pass through a reaction zone 1718 where the reactant stream C is heated by heaters 1720*a,b* and 1722*a,b* to yield a product stream D comprising nanoparticles. The heaters 1720*a,b* and 1722*a,b* may be adjusted to form different zones in the reaction zone C having different zone temperatures. The product stream D is then passed through a collection liquid 1728 in a collection vessel 1726 where the nanoparticles are at least substantially removed from the product stream D to yield an effluent stream E. As shown here, three-way valves 1724 and 1730 are used to control the pressure and gas flow rates through the collection vessel 1726 so as to prevent the collection liquid 1728 from flowing back into the reaction zone 1718. It should be noted that other mechanism like vacuum and additional carrier gases introduced above the reaction zone may also be utilized to assist in preventing the collection liquid 1728 from flowing back into the reaction zone 1718.

In some embodiments, precursor solutions may comprise a volatile solvent and a nanoparticle precursor. Volatile solvents may, in some embodiments, be organic solvents having a boiling point of about 300° C. or less. Examples of volatile solvents suitable for use in conjunction with the methods described herein may include, but are not limited to alcohols (e.g., methanol, ethanol, isopropanol, and butanol), glycols, acetonitrile, water, and the like, any derivative thereof, and any combination thereof. Anhydrous precursor solvents may be used to minimize oxidation of the final product. The solvent may be selected, for example, based on the dielectric constant of the solvent. In various embodiments, the dielectric constant of the solvent may be matched to the dielectric constant of organometallic precursors. In other embodiments, the solvent may be selected based on its miscibility. For example, in certain embodiments, it may be desirable to create an emulsion for use as precursor as opposed to solvents miscible with precursor that creates a solution.

Nanoparticle precursors may, in some embodiments, be organometallic compounds. Nanoparticle precursors may include silicon chloride, germanium chloride, etc. Nanoparticle precursors may comprises transition elements (e.g., titanium, chromium, iron, cobalt, nickel, copper, zinc, molybdenum, palladium, silver, cadmium, tungsten, platinum, and gold), lanthanide elements (e.g., europium, gadolinium, and erbium), Group III elements (boron, aluminum, gallium, indium, and thallium), Group IV elements (e.g., germanium, silicon, tin, lead, and carbon), Group V elements (e.g., nitrogen, phosphorous, arsenic, antimony, and bismuth), Group VI elements (e.g., oxygen, sulfur, selenium, and tellurium), or any combination thereof. Examples of nanoparticles precursors suitable for use in conjunction with the methods described herein may, in some embodiments, include, but are not limited to, tetraethylgermane, tetramethylgermane, tetraethylsilane, tetramethylsilane, diethylsilane, diethylgermane, diethyl silane, tetrapropyl germane, tetrapropyl silane and the like, any derivative thereof, or any combination thereof.

In some embodiments, more than one nanoparticle precursor may be utilized in the precursor solutions described herein. For example, a precursor solution may comprise a first nanoparticle precursor that includes germanium and a second nanoparticle precursor that includes silicon. In some embodiments, precursor solutions may comprise more than one nanoparticle precursor such that the mole ratio of the metal of the first nanoparticle precursor (e.g., germanium) to the metal of the second nanoparticle precursor (e.g., silicon) ranges from a lower limit of about 1:10, 1:5, or 1:1 to an upper limit of about 10:1, 5:1, or 1:1, and wherein the mole ratio may range from any lower limit to any upper limit and encompasses any subset therebetween. In other embodiments, when multimodal distributions are desired, pure organometallic precursors may be used in accordance with a droplet disintegration mechanism. One skilled in the art with the benefit of this disclosure should understand that the germanium and silicon example is nonlimiting and other combinations of nanoparticle precursors may be applicable, e.g., cadmium and selenium, tin and tellurium, and zinc and sulfur.

In some embodiments, the nanoparticle precursors may be present in the precursor solutions described herein in an amount ranging from a lower limit of about 20%, 30%, 40%, or 50% by volume of the precursor solution to an upper limit of about 90%, 70%, 50%, or 40% by volume of the precursor solution, and wherein the amount may range from any lower limit to any upper limit and encompasses any subset therebetween.

In some embodiments, aerosolizing the precursor solution may involve at least one of sonicating the precursor solution with the sonication probe immersed in the precursor solution (e.g., as shown in FIG. 17), nebulizing the precursor solution, passing the precursor solution through a nozzle (e.g., an aerosolizing nozzle), electrostatic precipitation, and the like, and any combination thereof.

In some embodiments, aerosolizing the precursor solution, including by any method described herein, may be performed at a frequency ranging from a lower limit of about 1 kHz, 10 kHz, 100 kHz, 1 MHz, 10 MHz, or 100 MHz to an upper limit of about 1000 MHz, 100 MHz, 10 MHz, 1 MHz, or 100 kHz, and wherein the frequency may range from any lower limit to any upper limit and encompasses any subset therebetween (e.g., 3 kHz to 150 kHz). In some embodiments, aerosolizing the precursor solution, including by any method described herein, may be performed at a frequency so as to yield strained nanoparticles (described further herein), which may be a frequency ranging from a lower limit of about 1 kHz, 3 kHz, 10 kHz, or 15 kHz to an upper limit of about 200 kHz, 150 kHz, 50 kHz, or 25 kHz, and wherein the frequency may range from any lower limit to any upper limit and encompasses any subset therebetween, e.g., 5 kHz to 22 kHz.

In some embodiments, aerosolizing the precursor solution, including by any method described herein, may be performed at an input power ranging from a lower limit of about 10 Watts (or a frequency of about 5 kHz) to an upper limit of about 100 Watts (or a frequency of about 22 kHz), and wherein the input power may range from any lower limit to any upper limit and encompasses any subset therebetween. Those skilled in the art will appreciate that additional factors relating to energy supplied to the system may also affect the physical properties of the resulting nanoparticles, such as the internal strain. Additional factors may include waveform, amplitude, heat, or any other additional energy added into the system when forming droplets at input.

In some embodiments, the aerosolized precursor solution B may be mixed with a carrier gas A to form a reactant stream C. The carrier gas A may transport the aerosolized precursor solution through the reaction zone 1718. Further the flow rate of the carrier gas A may be adjusted to provide for a desired residence time of the reactant stream C in the reaction zone 1718. In some embodiments, the residence time of the reactant stream C in the reaction zone 1718 may range from a lower limit of about 1 sec to an upper limit of about 10 sec.

In some embodiments, the carrier gas A may be an inert gas (e.g., helium). In other embodiments, the carrier gas A may not be inert (e.g., hydrogen). Examples of carrier gases suitable for use in conjunction with the methods described herein may, in some embodiments, include, but are not limited to, hydrogen, helium, nitrogen, argon, carbon dioxide, and the like, and any combination thereof.

In some embodiments, the reactant stream C may be heated to a temperature above the boiling point of the volatile solvent so as to form a product stream D that comprises a plurality of nanoparticles. In some embodiments, the temperature above the boiling point of the volatile solvent may range from a lower limit of about 500° C., 600° C., or 700° C. to an upper limit of about 1200° C., 1100° C., 1000° C., or 900° C., and wherein the temperature may range from any lower limit to any upper limit and encompasses any subset therebetween.

In some embodiments, heating may involve passing the reactant stream C through a tube furnace, series of tube furnaces, or the like. Without being limited by theory, it is believed that nanoparticle precursors and/or nanoparticles may collect on the walls of the tube passing through the tube furnace, thereby decreasing the overall yield of nanoparticles produced. Various embodiments may minimize interaction between the walls and the reactant stream. Minimizing such interactions may, in some embodiments, involve at least one of orienting the tube furnace vertically, spinning the tube through which the reactant stream is passing, applying an electric charge to the tube, providing sheath flow within the tube furnace (e.g., flowing a sheath of a gas between the tube wall and the reactant stream), creating a vortex within the reactant stream (e.g., with a spinning or oscillating rod or the like extending into the reaction zone), using a tapered tube in conjunction with a cortex, and the like, any hybrid thereof, and any combination thereof.

Some embodiments may pass the product stream D through the collection liquid 1728 so as to collect the nanoparticles therein. The collection liquid 1728 may, in some embodiments, be solvents suitable for use in applications downstream of nanoparticle production (e.g., deposition on surfaces, compounding with polymers, chemical modification, and the like). Examples of the collection liquid 1728 suitable for use in collecting nanoparticles produced by the methods and systems described herein may include methanol, ethanol, glycol, water, tetrahydrofuran (THF), diethylcarbonate, acetonitrile, dichlorobenzene, acetone, toluene, pentane and the like, any derivative thereof, or any combination thereof.

In some embodiments, the collection liquid 1728 may further comprise suspension agents, which may, in some embodiments, assistant suspension of the nanoparticles and/or mitigate clustering of the nanoparticles. In some embodiments, suspension aids may covalently or noncovalently interact with the nanoparticles. Examples of suspension agents suitable for use in conjunction with the production of nanoparticles described herein may include surfactants, polymers, chelating agents, capping agents (e.g., octanol, oleylamine, and trioctylamine), and the like, or any combination thereof.

In some embodiments, the path that the product stream C follows from the reaction zone to the collection liquid 1728 may be substantially straight (e.g., containing a bend or deviation of about 30° or less) and/or substantially vertical (e.g., about 30° or less off-vertical) to minimize the collection of nanoparticle precursors and/or nanoparticles on surfaces, thereby increasing the yield of nanoparticles. In some embodiments, the yield of nanoparticles may be about 65% or greater, about 75% or greater, or more preferably about 85% or greater (e.g., about 85% to about 90%) by weight of the metal of the nanoparticle precursor relative to the metal of the nanoparticle produced.

Figure 18:
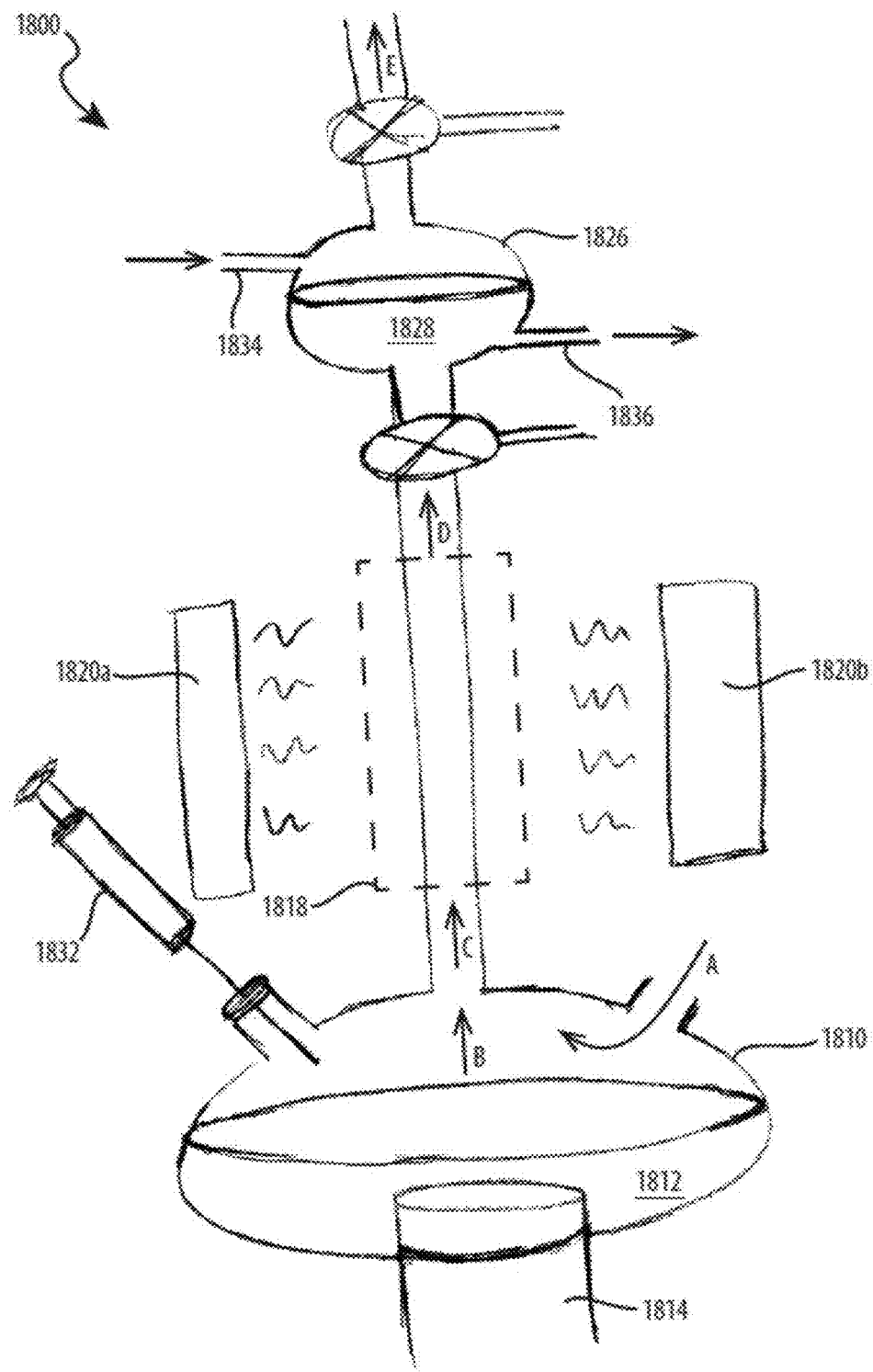
FIG. 18 is a schematic diagram of an alternate system for producing nanoparticles.

In some embodiments, the methods and systems described herein may be adapted for continuous and high-production rate nanoparticle production. Referring now to FIG. 18, a system for producing nanoparticles, generally designated 1800, is shown. The system 1800 may include precursor solution vessel 1810 that contains precursor solution 1812. The precursor solution 1812 may be in contact with an apparatus 1814, e.g., a large-scale mister or fogger, capable of producing large volumes of aerosolized precursor solution B. To enable a continuous process, system 1800 may include syringe pump 1832 (or another similar automated addition system) for continuous addition of precursor solution 1812.

Precursor solution vessel 1810 has passing through it a carrier gas A, which mixes with an aerosol B to yield a reactant stream C. The reactant stream C may pass through a reaction zone 1818 where the reactant stream C is heated by heaters 1820*a/b* to yield a product stream D that comprises nanoparticles. It should be noted that the reaction zone 218 may comprise a single large diameter tube or the like as illustrated in FIG. 18 or several smaller tubes or the like in parallel to accommodate the larger processing volumes associated with the use of the solution vessel 1812. The product stream D is then passed through a collection liquid 1828 in a collection vessel 1826 where the nanoparticles are at least substantially removed from the product stream D to yield an effluent stream E. As shown, the collection vessel 1826 may comprise an inlet 1834 and an outlet 1836 for continuous flow of the collection liquid 1828 to enable continuous extraction of the nanoparticles produced in this or a similar process.

As used herein, the term "continuous" refers to being without interruption for a prolonged time frame (e.g., about 3 hours or greater). It should be noted that continuous actions may be performed intermittently over the short-term (e.g., seconds to minutes) and still be considered continuous over the long term. For example, continuous addition of precursor solutions may include the intermittent addition of precursor solutions over a prolonged time frame, e.g., the addition of about 1 mL of precursor solution every 15 minutes.

Some embodiments may continuously aerosolize a precursor solution 1812 in the presence of a flowing carrier gas A, thereby yielding a reactant stream C; continuously replenishing the precursor solution 1812; heating the reactant stream C to a temperature above a boiling point of the volatile solvent so as to form a product stream D that comprises a plurality of nanoparticles; cooling the product stream D; and passing the product stream D through a collection liquid 1828 so as to collect the nanoparticles from the product stream.

Some embodiments may further involve continuously replacing the collection liquid 1828, e.g., when the nanoparticles have reached a desired concentration therein.

Some embodiments may further involve extracting the nanoparticles from the collection liquid 1828 (e.g., continuously or batchwise). In some embodiments, extracting the nanoparticles from the collection liquid 1828 may involve centrifuging, continuous centrifuging (e.g., flow centrifugation), filtering, concentrating the nanoparticles, decanting the collection liquid after having allowed the nanoparticles to settle, and the like, and any hybrid thereof.

In some embodiments, the methods and systems described herein may form unstrained nanoparticles and/or strained nanoparticles. For example, in a bimodal distribution larger nanoparticles may form having strain, while smaller nanoparticles may have negligible strain. As used herein, the term "strained nanoparticles" refers to nanoparticles having a strained crystal structure, which can be determined by a shift in a crystal plane when analyzed by x-ray diffraction ("XRD"). In some embodiments, the strained nanoparticles may be nanocrystals, core-shell nanoparticles with a crystalline core and an amorphous shell, SiGe core shell nanoparticles, and the like. It should be noted that, unless otherwise specified, the term "nanoparticle" encompasses both unstrained nanoparticles and strained nanoparticles.

Without being limited by theory, it is believed that the frequency of aerosolization, the amplitude of aerosolization, residence time in the reaction zone, and temperature affect the degree of strain, diameter distribution, and/or the morphology of the nanoparticle formed by the systems and processes described herein. For example, the use of higher frequencies during aerosolization may yield larger nanoparticles. In another example, the use of higher amplitudes during aerosolization may yield nanoparticles with higher strain.

The nanoparticles (strained or unstrained) may comprise the metal(s) of the nanoparticle precursor(s) used in the production of the nanoparticles. For example, the methods and systems described herein may utilize a precursor solution comprising cadmium and selenium may yield cadmium selenide nanoparticles. In another example, the methods and systems described herein may utilize a precursor solution comprising gold, platinum, or palladium to yield gold, platinum, or palladium nanoparticles. In yet another example, methods and systems described herein may utilize a precursor solution comprising germanium and silicon in a desired ratio so as to yield nanoparticles comprising germanium and silicon at about the desired ratio.

Strained nanoparticles may, in some embodiments, comprise Group III, Group IV, Group V, and/or Group VI elements. For example, a strained silicon nanoparticle may have a 2θ value for the (111) crystal plane shifted by about 4° to about 6° from the (111) crystal plane of bulk silicon. In some embodiments, the 2θ value for the (111) crystal plane of the strained nanoparticles may shift relative to the corresponding bulk material from a lower limit of about 1°, 2°, or 3°, or 4° to an upper limit of about 8°, 7°, 6°, 5°, or 4°, and where the shift may range from any lower limit to any upper limit and encompasses any subset therebetween.

In some embodiments, the strained nanoparticles may comprise Group IV elements (e.g., germanium, silicon, tin, lead, carbon, or any combination thereof). In other embodiments, the strained nanoparticles may comprise a mole ratio of silicon to germanium that ranges from a lower limit of about 1:10, 1:5, or 1:1 to an upper limit of about 10:1, 5:1, or 1:1, and wherein the mole ratio may range from any lower limit to any upper limit and encompasses any subset therebetween.

In some embodiments, the nanoparticles (strained or unstrained) described herein may have an average diameter in at least one dimension ranging from a lower limit of about 3 nm, 5 nm, 10 nm, 25 nm, or 100 nm to an upper limit of about 1000 nm, 500 nm, 250 nm, 150 nm, 100 nm, or 50 nm, and wherein the average diameter in at least one dimension may range from any lower limit to any upper limit and encompasses any subset therebetween.

In some embodiments, the nanoparticles (strained or unstrained) described herein may have a narrow diameter distribution such that the standard deviation from the average diameter ranges from a lower limit of ± about 0.5 nm, 1 nm, or 2 nm to an upper limit of ± about 10 nm, 7 nm, or 5 nm, and wherein the standard deviation may range from any lower limit to any upper limit and encompasses any subset therebetween.

In some embodiments, the nanoparticles (strained or unstrained) described herein may have a multimodal diameter distribution (e.g., bimodal, trimodal, and so on). In some embodiments, the nanoparticles (strained or unstrained) described herein having a multimodal diameter distribution may have at least one mode with an average diameter in at least one dimension ranging from a lower limit of about 4 nm, 7 nm, 12 nm, or 25 nm, to an upper limit of about 250 nm, 150 nm, 100 nm, or 50 nm, and wherein the average diameter in at least one dimension may range from any lower limit to any upper limit and encompasses any subset therebetween.

In some embodiments, the modes of a multimodal diameter distribution of the nanoparticles (strained or unstrained) described herein may independently have a narrow diameter distribution such that the standard deviation for each mode independently ranges from a lower limit of ± about 0.5 nm, 1 nm, or 2 nm to an upper limit of ± about 10 nm, 7 nm, or 5 nm, and wherein the standard deviation may range from any lower limit to any upper limit and encompasses any subset therebetween.

In some embodiments, the nanoparticles may produce photoluminescence based on the size of the nanoparticles. When the physical size of a particle is less than its exciton radius (i.e., physical distance an electron must travel from its valence band to conduction band), the quantum phenomenon of photoluminescence can be observed. For example, the exciton radius of silicon is 24 nm. That is, an electron must travel 24 nm from its valence band to the conduction band. However, various embodiments may produce silicon particles that are less than 24 nm, (e.g., it is possible to synthesize 5 nm silicon particles). In such embodiments, when a photon of sufficient energy (i.e., ultraviolet light or, more specifically, a photon greater than the band gap energy of the nanoscale material) is absorbed by the nanoparticle, an electron is excited from the valence band to the conduction band. The electron may then fall back into the valence band and emit a photon of light at a wavelength based on the difference between the particle size and the exciton radius. In the case of 5 nm silicon, it is blue light. As the physical size of the particle approaches the exciton radius, photoluminescence is no longer observed and the material begins to behave as a bulk material.

In various embodiments, the diameter of the nanoparticles may be determined based on the relationship $$D_p = \sigma^*(f)^{-0.66}(Q)^{0.207}(Y)^{-0.11}(\rho)^{0.274}(\eta)^{0.166}(\text{power/area})^{0.4}$$

where Dp is the diameter of the resulting particles, σ is a constant which depends on temperature and choice of precursor solution, f is the transducer/sonicating frequency, Q is the flow rate of the carrier gas, Y is the surface tension of the precursor, ρ is the density of the precursor, η is viscosity of the precursor, and power/area is the power density.

In some embodiments, the strained nanoparticles may exhibit piezoelectric effects. Piezoelectricity is the special circumstance of electrical charge build-up that arises in certain solid material structures due to mechanical stress. Generally, the piezoelectric effect has been experimentally determined to be a linear electromechanical interaction between the mechanical and the electrical state in crystalline materials with no inversion symmetry. The piezoelectric effect is a reversible process such that the internal generation of electrical charge resulting from an applied mechanical force can be reversed with the internal generation of a mechanical strain resulting from an applied electrical field.

Regarding the piezoelectric effect in bulk semiconductors, changes in interatomic spacing resulting from strain affects the semiconductors intrinsic band gap making it easier (or harder depending on the material and strain) for electrons to be raised into the conduction band. The piezoelectric effect of semiconductor materials can be several orders of magnitudes larger than the analogous geometrical effect in metals and is present in materials like germanium, polycrystalline silicon, amorphous silicon, silicon carbide, and single crystal silicon.

The piezoelectric effects of semiconductors have been used for sensor devices with a variety of semiconductor materials such as germanium, polycrystalline silicon, amorphous silicon, and single crystal silicon. Since silicon is currently the material of choice for nearly all integrated circuits, the use of piezoelectric silicon devices has been an intense area of research interest.

Regarding the piezoresistive effect in bulk single crystal silicon and germanium, the resistance of silicon and germanium can change due to a stress-induced change of geometry, but also due to the stress dependent resistivity of the material. The resistance of n type silicon (predominant charge carriers responsible for electrical conduction are electrons) mainly changes due to a shift of the three different conducting vertices of the crystal. The shifting causes a redistribution of the carriers between vertices with different mobilities. This results in varying mobilities dependent on the direction of current flow. A minor effect is due to the effective mass change related to shape distortion due to change in the inter-atomic spacing of valley vertices in single crystal silicon. In p-type silicon (predominant charge carriers responsible for electrical conduction are holes) the phenomena currently being researched are more complex and also demonstrate changes in mass and hole transfer.

Regarding the piezoelectric mechanism, the nature of the piezoelectric effect is rooted in the occurrence of electric dipole moments in solids. An electric dipole moment is a vector quantity equal to the product of the magnitude of charge and the distance of separation between the charges. Electric dipole moments in solids may either be induced for ions on crystal lattice sites as in an asymmetric charge environment such as in lithium tantalate and lead zirconate-titanate or may be directly carried by molecular groups such as in organic sugar molecules. The dipole density causing polarization is the sum of the dipole moments per unit volume of a crystal unit cell. Since electric dipoles are vector quantities (geometric objects of specific magnitude and direction), the dipole density P is also a vector quantity. Dipoles near each other tend to be aligned in regions called Weiss domains. In these aligned regions occurring between individual particles, the particles act as a whole. Thus, the potential and polarity of voltage and magnitude and direction of the current is equal to the sum of all individual particles making up the entire solid.

To reiterate, typically the piezoelectric effect occurs with an applied mechanical stress but can also be manifested by manufacturing internal stress into certain solids. Piezoelectricity arises because of variation of the polarization strength, direction, or both. The magnitude and direction of the charge depends on the interrelationships between the orientation of its dipole density P within individual particles, particle symmetry, and the applied mechanical stress or induced internal stress. Although the change in an individual crystal's dipole density appears quantitatively as a variation of surface charge density upon the individual crystal faces, the overall useful energy arising from the piezoelectric phenomenon is caused by the superposition of the dipole densities of the crystals that make up the entire piece of material, i.e., as a sum of the individual crystallographic unit cells that make up a whole crystal. For example, a 1 cm$^3$ cube of quartz with 500 lb of mechanically applied force at the right point can produce a voltage of about 12500 V because the resultant force is the sum of all the individual crystallographic unit cells that make up the whole crystal.

Regarding power generation in bulk polar crystal structures synthesized in a state of stress, there are 32 crystal classes that represent 32 possible combinations of symmetry operations in crystalline materials. Each crystal class includes crystal faces that uniquely define the symmetry of the class. Of the thirty-two crystal classes, twenty-one are non-centrosymmetric (not having a centre of symmetry), and of these, twenty exhibit direct piezoelectricity. Ten of these include the polar crystal classes, which show a spontaneous polarization without an applied mechanical stress due to a non-vanishing electric dipole moment associated with asymmetry inherent in their crystal structure. For polar crystals, for which the summation of the dipole density P≠0 holds without applying a mechanical load, the piezoelectric effect manifests itself by changing the magnitude or the direction of P or both. Stated another way, polar crystals that can be manufactured to have internal stress will demonstrate a piezoelectric effect without an applied mechanical load.

Restated another way, for non-polar piezoelectric crystals, an applied mechanical load transforms the material from a non-polar crystal class (P=0) to a polar one, having P≠0 and hence gives rise to a voltage potential and useful energy capable of powering an external device. However, crystals predisposed to an internal state of stress have an inherent polar structure for which P≠0 and hence energy can be discharged from the structure without an applied mechanical load. During discharge of electrical energy, the crystal relaxes back into its preferred state of interatomic spacing.

In various embodiments, producing strained nanocrystals depends on a variety of factors including, for example, the composition of the nanocrystals, the temperature(s) of the reaction zone(s), the frequency and power of the sonicator/mister/fogger/transducer, among other factors. In one embodiment, strained Si nanocrystals may be produced in a three stage reaction zone, where the three stages have temperatures of 850° C., 850° C., and 650° C., and the power supplied by the sonicator is greater than 175 W and less than 700 W. In another embodiment, strained germanium nanocrystals may be produced in a three stage reaction zone, where the three stages have temperatures of 750° C., 750° C., and 550° C., and the power supplied by the sonicator is greater than 462 W and less then 700 W. In yet another embodiment, SiGe nanocrystals may be produced in a three stage reaction zone, where the three stages have temperatures of 800° C., 800° C., and 575° C., and the power supplied by the sonicator is greater than 390 W and less than 700 W.

In addition to producing strained nanoparticles, various embodiments enable production of quantum confined nanoparticles, which allows for increased energy density in a quantum energy device (QED) produced with the nanoparticles. Quantum confinement in nanocrystals occurs when the physical size of the particle is less than its characteristic exciton Bohr radius. The exciton Bohr radius is the physical distance separating a negatively charged electron from its positively charged hole left behind during excitation. When the physical size of the particle is less than the distance the electron must travel during excitation, the material is considered to be quantum confined. For example, the exciton Bohr radius for germanium is 24.3 nm; however, it is possible to synthesize germanium nanocrystals to be 1 nanometer in diameter. By creating nanoparticles smaller than this characteristic distance, the electronic properties of the nanoparticles can be tuned to discreet energy levels by adjusting particle size. Thus, an aggregate made of particles smaller than the Bohr radius will enjoy a greatly increased energy density. If the particles are about the same size as the Bohr exciton radius, or even a little larger, an aggregate of the particles will still enjoy increased energy density, if not to the same degree as if all of the particles were smaller than the exciton Bohr radius.

Nanoparticles produced according to embodiments of this disclosure also benefit from shallow potential wells and therefore require less activation energy than larger particles to excite electrons from the valence band to the conduction band by virtue of quantum tunneling. Potential wells are a direct result of synthesizing physical particle dimensions to be smaller than their respective exciton Bohr radius. A potential well is the region surrounding a local minimum of potential energy in nanomaterials. Energy captured in a potential well is unable to convert to another type of energy because it is captured in the local minimum of the potential well. Therefore, a body may not proceed to the global minimum of potential energy, as it naturally would, according to the universal nature of entropy. Energy may be released from a potential well if sufficient energy is added to the system such that the local minimum energy for excitation is sufficiently overcome. However, in quantum physics potential energy may escape a potential well without added energy due to the probabilistic characteristics of quantum particles. In these cases, a particle may be imagined to tunnel through the walls of a potential well without energy added to the system.

Figure 19:
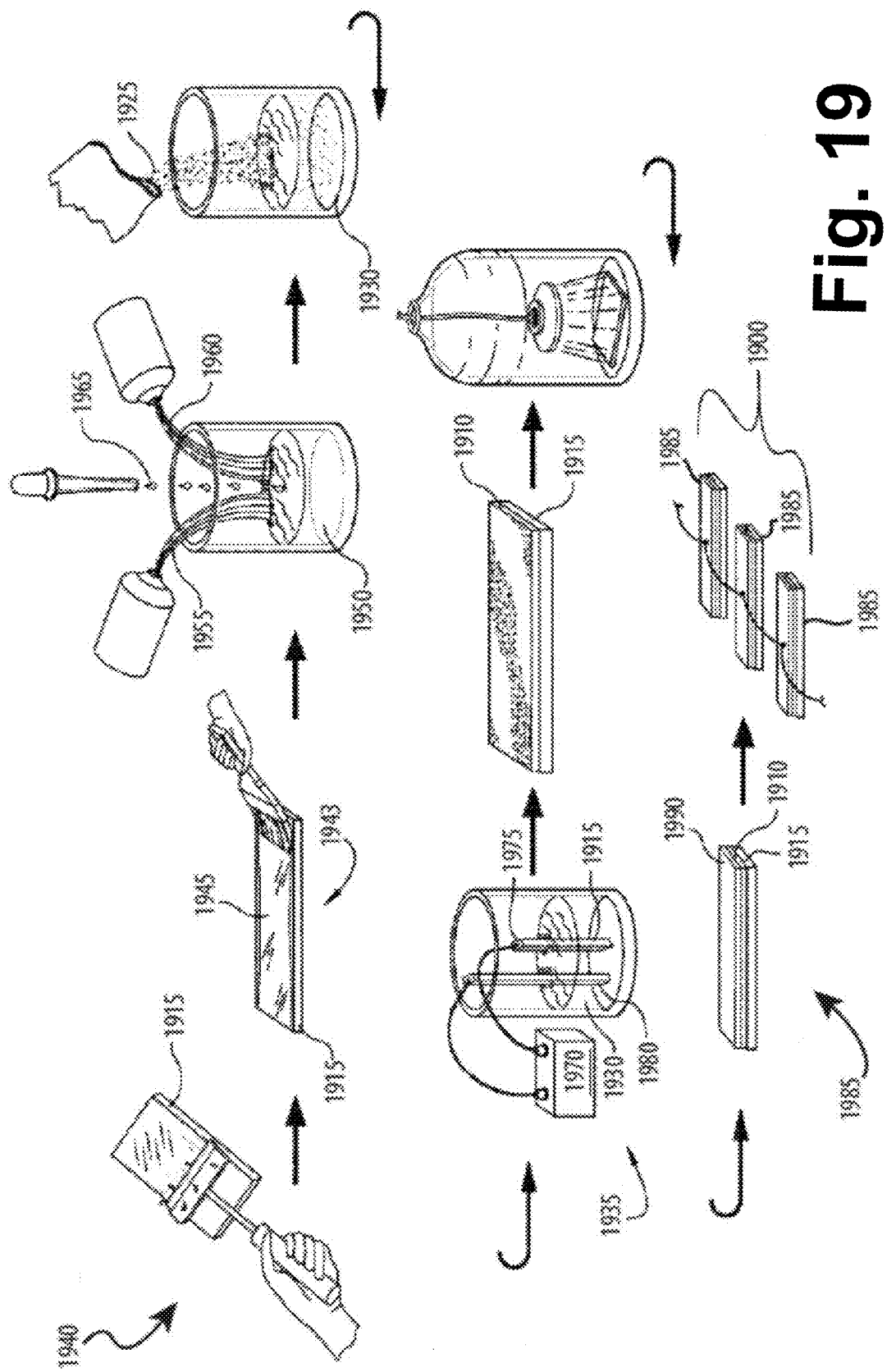
FIG. 19 is a process chart illustrating the fabrication of one or more devices that comprise nanoparticles.

FIG. 19 illustrates a method of producing a nanoparticle coating or film 1910 on a substrate 1915 under conditions of ambient atmospheric composition and pressure. The embodiment of FIG. 19 may also be performed at ambient or slightly elevated temperature. The embodiment of FIG. 19 includes electrophoretically depositing nanoparticles 1925 from a nonaqueous colloidal suspension 1930 and substantially uniformly depositing 1935 the nanoparticles 1925 onto the substrate 1915. The coating or film 1910 may, in some embodiments, be less than 1000 nanometers in thickness, but may be thicker in other embodiments. A substrate 1915 desired to be coated may be prepared by first cleaning 1940 the substrate 1915, and then, if the substrate 1915 is not sufficiently electrically conductive, coating 1943 the substrate 1915 with a layer of conductive material 1945, such as silver or indium tin oxide (typically used to prepare optical elements, since thin layers of indium tin oxide are substantially optically transparent).

A nonaqueous suspension 1930 of nanoparticles 1925 may be prepared or provided from the synthesis of the nanoparticles (e.g., the nanoparticles in the collection liquid as described herein), for use in the deposition process. The liquid suspension medium 350 (or collection liquid depending on the embodiment) may be a polar solvent, such as 2-butanol, 1,2-dichlorobenzene and/or acetone, or the like. The liquid suspension medium 350 composition is selected taking into account such properties as its inherent dielectric constant, Hamaker constant, miscibility, viscosity, and the like. In various embodiments, a blend of aprotic polar nonaqueous solvents 1955 and protic polar nonaqueous solvents 1960 is selected to define the liquid suspension medium 1950.

In some embodiments, small amounts of an ionic liquid 1965, such as 1-butyl-methylpyrrolidinium bis(trifluoromethylsulfonyl)imide may be added to the liquid suspension medium 1950 (or collection liquid depending on the embodiment) to facilitate deposition of nanoparticle films 1910.

In some embodiments, a buffer solution (not shown) may be added to the liquid suspension medium 1950 (or collection liquid depending on the embodiment) to manage the surface charge on the nanoparticles 1925. For example, silicon particles are negatively charged in the pH range between about 6 and about 9 while germanium particles are negatively charged in the pH range from about 3 to about 5.

Regarding preparing a nanoparticle suspension, a predetermined and measured amount of nanoparticles 1925 may be dispersed in the liquid suspension medium 1950 (optionally including the ionic liquid 1965 and/or a buffer solution (not shown)). The liquid suspension medium 1950 may be agitated until the nanoparticles 1925 are generally evenly and homogeneously dispersed to define a colloidal suspension 1930.

The substrate 1915 connected to a DC power source 1970 may serve as a cathode 1975 while a second electrode or electrode array 1980 (such as a carbon electrode) immersed the colloidal suspension 1930 may be used to complete an electric circuit and establish an electric field. The substrate 1915 is typically the cathode 1975 and the carbon electrode is typically the anode 1980. The electrodes/electrode arrays 1975, 1980 may be, for example, maintained at a distance of between about 0.5 and about 4.0 centimeters apart, depending upon such variables as the desired deposition pattern, the shape of the electrodes 1975, 1980, the shape of the substrate 1915, and the like. However, under certain circumstances the electrode separation distance may fall outside of the 0.5 to 4.0 centimeter range. The applied voltage is typically between about 3 and about 12 volts, depending on the nanoparticle size. The nanoparticles 1925 in the colloidal suspension 1930 electrophoretically migrate to the substrate 1915, forming a substantially even coating 1910 thereupon.

The nanoparticles 1925 may, in some embodiments, be of any convenient shape and geometry, and are generally regularly shaped and are typically blocky, and, more typically, generally spherical. Typically, the nanoparticles 1925 will be tightly sized, having a relatively narrow diameter distribution, to yield a coating or film 1910 of nanoparticles 1925 having a narrow diameter distribution, such as, for example, wherein most of the nanoparticles 1925 fall in the 3-10 nanometer range. Alternately, the applied voltage, current and/or the pH of the colloidal suspension 1930 may be varied to yield similar control over the size of the deposited nanoparticles 1925 when the colloidal suspension 1930 includes a substantial amount of nanoparticles 1925 falling outside the target size range. Further, by varying the applied voltage and/or the pH of the colloidal suspension 1930, multiple layers of nanocrystals may be applied to a substrate 1915 in a predetermined, size-specific of graduated order. The deposition process 1935 may be continued until the desired film thickness is achieved, typically for about 30 seconds to about 5 minutes to yield a deposited layer typically from a few hundred to a few thousand nanometers thick. Typically, the deposition process 1935 is conducted under ambient atmosphere; no vacuum is required.

The effective surface area of the film 1910 is a function of the nanocrystalline particle size and shape and is governed by the desired end use and does not change the method of deposition. Likewise, there is no requirement that the electrode or electrode array 1980 be of equal or larger size than the cathode 1975 that the nanoparticles will be deposited upon.

Once electrophoretic deposition 1935 of the nanoparticles 1925 is complete, a coated substrate 1985 may be finished by depositing a metal contact 1990 via thermal evaporation or the like over the film 1910 to protect the nanoparticle film 1910 and establish a pathway for electrons to travel to be used to power an external device. The metal contact 1990 is typically a highly electrically conductive metal, such as gold, platinum, silver, copper or the like, and is typically, but not limited to, between about 100 nm and about 400 nm thick.

Using standard electrical connection techniques, multiple coated substrates 85 may be connected in a series/parallel fashion to yield a quantum energy device 1900 configured to generate the desired voltage/current supply configuration. In some embodiments, a QED can be completed and configured to power a desired load.

Example 11

Strained silicon nanoparticles were produced in a reactor similar to that described above in reference to FIG. 1 in the vertical configuration so illustrated. Tetraethylsilane and methanol were mixed to yield a precursor solution. The precursor solution was sonicated with an QSONICA MODEL Q700 sonicator (available from QSONICA) immersed therein at a frequency of about 22 kHz. An argon carrier gas flowing at about 1000 mL/min was used to transport the aerosolized precursor solution into the reaction zone (approximately 1 m in length), which was at about 850° C. The product stream was collected in methanol. The resultant nanoparticles were analyzed by transmission electron microscopy and x-ray diffraction.

Example 12

Strained silicon nanoparticles were produced in a reactor similar to that described above in reference to FIG. 17 in the vertical configuration so illustrated. Isobutylsilane was used as a precursor solution. The precursor solution was sonicated with an QSONICA MODEL Q700 sonicator (available from QSONICA) immersed therein at a frequency of about 20 kHz. A carrier gas flowing at about 16.67 $cm^3/s$ was used to transport the aerosolized precursor solution into the reaction zone (approximately 1 m in length), which was divided in to three zones having temperatures of about 850° C., 850° C., and 650° C., respectively. The product stream was then collected. The resultant nanoparticles were approximately 12 nm in diameter with a σ value of 0.00165 and a strain of approximately +0.45 degrees in the 111 plane of the silicon crystal as determined by transmission electron microscopy and x-ray diffraction.

Example 13

Strained germanium nanoparticles were produced in a reactor similar to that described above in reference to FIG. 17 in the vertical configuration so illustrated. Tetraethylgermane was used as a precursor solution. The precursor solution was sonicated with an QSONICA MODEL Q700 sonicator (available from QSONICA) immersed therein at a frequency of about 20 kHz. A carrier gas flowing at about 16.67 $cm^3/s$ was used to transport the aerosolized precursor solution into the reaction zone (approximately 1 m in length), which was divided in to three zones having temperatures of about 750° C., 750° C., and 550° C., respectively. The product stream was then collected. The resultant nanoparticles were approximately 8 nm in diameter with a σ value of 0.00142 and a strain of approximately +1.4 degrees in the 111 plane of the silicon crystal as determined by transmission electron microscopy and x-ray diffraction.

Example 14

Strained silicon-germanium nanoparticles were produced in a reactor similar to that described above in reference to FIG. 17 in the vertical configuration so illustrated. Isobutylsilane and tetraethylgermane ere used as a precursor solution. The precursor solution was sonicated with an QSONICA MODEL Q700 sonicator (available from QSONICA) immersed therein at a frequency of about 20 kHz. A carrier gas flowing at about 16.67 $cm^3/s$ was used to transport the aerosolized precursor solution into the reaction zone (approximately 1 m in length), which was divided in to three zones having temperatures of about 800° C., 800° C., and 575° C., respectively. The product stream was then collected. The resultant nanoparticles were produced in a ratio of approximately 1:3 silicon to germanium with a σ value of 0.00149 and a strain of approximately +1.64 degrees in the 111 plane of the silicon crystal as determined by transmission electron microscopy and x-ray diffraction.

The particular embodiments disclosed above are illustrative only, and may be modified and practiced in different but equivalent manners apparent in view of the teachings herein. Furthermore, no limitations to the details of construction or design herein shown are intended, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

The above specification, examples and data provide a complete description of the structures, methods, and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for manufacturing anodes for use in a lithium ion battery comprising
    mixing Si, Ge, or SiGe nanocrystals within a fluid containing a lithium electrolyte;
    placing a first lithium metal electrode within the fluid mixture
    placing a second lithium metal electrode within the fluid mixture spatially separated from the first lithium metal electrode;
    applying a voltage across the electrodes such that the first lithium metal electrode is positively charged; and
    allowing a paste of lithium-intercalated Si, Ge, or SiGe nanocrystals suitable for use in a prelithiated anode of a lithium ion battery to form on the first lithium metal electrode.

2. The method of claim 1, further comprising
    removing the paste from the first lithium metal electrode; and
    mixing the paste with a binder.

3. The method of claim 2 further comprising mixing the paste with a conductive carbon additive.

4. The method of claim 2 further comprising
    depositing the paste and binder mixture on a conductive anode substrate; and
    curing the binder to adhere the paste to the conductive anode substrate.

5. The method of claim 4, wherein the depositing and curing operations are conducted under ambient temperature and pressure conditions in air.

6. The method of claim 1, wherein the Si nanocrystals are substantially spherical and are 150 nm or less in diameter.

7. The method of claim 1, wherein the Ge nanocrystals are substantially spherical and are 150 nm or less in diameter.

8. The method of claim 1, wherein the fluid contains an ionic fluid, a nonaqueous solvent, or a combination of both.

9. The method of claim 8 further comprising
removing the paste from the first lithium metal electrode; and
mixing the paste with a binder.

10. The method of claim 9 further comprising mixing the paste with a conductive carbon additive.

11. The method of claim 9 further comprising
depositing the paste and binder mixture on a conductive anode substrate; and
curing the binder to adhere the paste to the conductive anode substrate.

12. The method of claim 11, wherein the depositing and curing operations are conducted under ambient temperature and pressure conditions in air.

13. The method of claim 8, wherein the Si nanocrystals are substantially spherical and are 150 nm or less in diameter.

14. The method of claim 8, wherein the Ge nanocrystals are substantially spherical and are 150 nm or less in diameter.

* * * * *